US012712626B2

(12) United States Patent
Visa et al.

(10) Patent No.: US 12,712,626 B2
(45) Date of Patent: Aug. 18, 2026

(54) CONTROL OF SIMULTANEOUS USE OF WIRELESS LINKS IN INTEGRATED ACCESS BACKHAULED NETWORKS

(71) Applicant: CANON KABUSHIKI KAISHA, Tokyo (JP)

(72) Inventors: Pierre Visa, Rennes (FR); Pascal Lagrange, La Chapelle des Fougeretz (FR); Philippe Le Bars, Thorigné-Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 18/249,340

(22) PCT Filed: Oct. 20, 2021

(86) PCT No.: PCT/EP2021/079139

§ 371 (c)(1),
(2) Date: Apr. 17, 2023

(87) PCT Pub. No.: WO2022/084416

PCT Pub. Date: Apr. 28, 2022

(65) Prior Publication Data

US 2023/0403067 A1 Dec. 14, 2023

(30) Foreign Application Priority Data

Oct. 23, 2020 (GB) ...................................... 2016898

(51) Int. Cl.
*H04B 7/155* (2006.01)
*H04L 47/34* (2022.01)
*H04W 28/08* (2023.01)

(52) U.S. Cl.
CPC ......... *H04B 7/15592* (2013.01); *H04L 47/34* (2013.01); *H04W 28/0892* (2020.05)

(58) Field of Classification Search
CPC ..... H04B 7/15592; H04L 47/34; H04L 45/24; H04W 28/0892; H04W 40/02; H04W 28/06; H04W 40/023
See application file for complete search history.

(56) References Cited

U.S. PATENT DOCUMENTS

2014/0293879 A1* 10/2014 Chen ....................... H04L 45/74 370/328
2020/0084663 A1 3/2020 Park
(Continued)

FOREIGN PATENT DOCUMENTS

CN 111093211 A 5/2020
CN 111294836 A 6/2020
KR 20200086625 A 7/2020

OTHER PUBLICATIONS

Qualcomm, PC5-S, PC5-RRC RLC mode, R2-1916162, 3GPP TSG RAN WG2 #108.
(Continued)

*Primary Examiner* — Nizam U Ahmed
(74) *Attorney, Agent, or Firm* — Canon U.S.A., Inc. IP Division

(57) ABSTRACT

In an Integrated Access and Backhaul, IAB, network, an IAB-node is configured as an initiator for performing BAP-sublayer processing to the aim of transmitting BAP packets over multiple RLC channels. BAP-sublayer processing may duplicate a received BAP packet. The same sequence number is appended to all the duplicates to allow another IAB-node terminating the duplication to recognize them. In a variant, BAP-sublayer processing may network encode one received BAP packet. Successive sequence numbers are assigned to the resulting BAP packets to allow another IAB-node terminating the network coding to recognize them. A terminator of the BAP-layer processing thus terminates the duplication by discarding all duplicates except one
(Continued)

or network decodes received packets with successive sequence numbers. Duplication process may be nested within another duplication or within a network encoding. This approach advantageously increases robustness of a wireless network, distributes the processing loads over multiple IAB-nodes and reduces bandwidth waste.

18 Claims, 11 Drawing Sheets

(56) References Cited

U.S. PATENT DOCUMENTS

2020/0221329 A1 7/2020 Kim
2021/0127296 A1* 4/2021 Akl ........................ H04L 45/24
2023/0199613 A1* 6/2023 Jung .................. H04W 40/248 370/329
2023/0292217 A1* 9/2023 Jung .................... H04W 40/14
2023/0362745 A1* 11/2023 Huang ................. H04W 40/36
2024/0179609 A1* 5/2024 Fujishiro ................ H04L 45/00

OTHER PUBLICATIONS

Qualcomm: "CR to 38.300 on Integrated Access and Backhaul for NR"; XP051841152; Retrieved from the Internet URL:https://ftp.3gpp.org/Email_Discussions/RAN2/%5BRAN2%23108%5D/%5B108%2310%5D%5BIAB%5D%20Running%20CR%2038300/draft%20R2-19xxxxx%20IAB%20running%20CR%20for%2038300%20v3.docx [Retrieved on Dec. 16, 2019].
Qualcomm: "CR to 38.300 on Integrated Access and Backhaul for NR"; XP051839218; Retrieved from the Internet URL:https://ftp.3gpp.org/Email_Discussions/RAN2/%5BRAN2%23108%5D/%5B108%2310%5D%5BIAB%5D%20Running%20CR%2038300/draft%20R2-19xxxxx%20IAB%20running%20CR%20for%2038300%20v3.docx [Retrieved on Dec. 16, 2019].
Qualcomm, CR to 38.300 on Integrated Access and Backhaul for NR, 3GPP TSG-RAN WG2 Meeting #110e, Jun. 1-12, 2020.

* cited by examiner

Figure 5
(a)
500
501
BAP Routing ID
502
Next Hop BAP Address
(b)
510
511
Next-hop BAP address
512
Prior-hop BAP address
513
Ingress BH RLC channel ID
514
Egress BH RLC channel ID
(c)
520
521
Traffic Type Identifier
522
Next-hop BAP address
523
Egress BH RLC channel ID
(d)
530
531
IPv6 flow label
532
DSCP
533
Destination IP Address
534
Next-hop BAP address
535
Egress BH RLC channel ID

CONTROL OF SIMULTANEOUS USE OF WIRELESS LINKS IN INTEGRATED ACCESS BACKHAULED NETWORKS

CROSS-REFERENCE TO RELATED APPLICATIONS

This application is the National Phase entry of International Application No. PCT/EP2021/079139, filed on Oct. 20, 2021 and titled "CONTROL OF SIMULTANEOUS USE OF WIRELESS LINKS IN INTEGRATED ACCESS BACKHAULED NETWORKS", which claims the benefit under 35 U.S.C. § 119(a)-(d) of United Kingdom Patent Application No. 2016898.5, filed on Oct. 23, 2020 and titled "CONTROL OF SIMULTANEOUS USE OF WIRELESS LINKS IN INTEGRATED ACCESS BACKHAULED NETWORKS". The above-identified patent applications are incorporated herein by reference in their entireties.

FIELD OF THE INVENTION

The present invention generally relates to wireless communications, in particular in Integrated Access Backhauled (IAB) networks.

BACKGROUND OF THE INVENTION

Wireless communication systems are largely deployed to address a wide range of applications, from mobile broadband, massive machine type communications to Ultra Reliable Low Latency Communications (URLLC). Such systems allow a plurality of user equipment (UE) or mobile terminals to share the wireless medium to exchange several types of data content (e.g. video, voice, messaging . . . ) over a radio access network (RAN) through one or more base stations. The base stations are conventionally wired-connected (e.g. through fiber) to a core network, forming an intermediate network, named backhaul (BH).

Examples of such wireless multiple-access communication systems include systems based on 3rd generation partnership project (3GPP) standards, such as fourth-generation (4G) Long Term Evolution (LTE) or recent fifth-generation (5G) New Radio (NR) systems, or systems-based IEEE 802.11 standards, such as WiFi.

The demand for network densification increases due to the rising number of users and higher throughput requirement.

Facing the issue of high deployment costs and time of the wired backhauling networks, 3GPP has proposed, in recent release 16 for 5G NR, a wireless backhaul, also known as Integrated access backhauling, IAB, where part of the wireless (i.e. radio) spectrum is used for the backhaul connection of base stations instead of fiber. The wireless backhaul communications (between base stations) thus use the same radio resources as access communications (between a base station and UEs).

IAB turns out to be a competitive alternative to the fiber-based backhauling in dense areas or areas difficult to cover, as it allows scalable and rapid installations without the burden of cabling the base stations.

IAB is most likely to operate in the millimeter wave (mmWave) band to achieve the required Gbps (gigabits per second) data rate.

However, millimeter waves are known to be subject to strong attenuations of signal strength in some weather conditions (rain, fog), and to blockage in case of obstacles located in the path between the emitter and the receiver.

To cope with these potential radio link failures, a topological redundancy can be provided within the IAB framework, where multiple data paths are set up between the IAB base station directly connected to the core network (also referred to as the "IAB-donor") and the IAB base station serving a UE (also referred to as the "access IAB-node"). Several intermediate IAB base stations (also referred to as IAB-nodes) may be involved in each of the several paths between the IAB-donor and the access IAB-node, thus forming alternative data paths within a multi-hop IAB network.

A path through a set of IAB-nodes is defined by default along which the data are preferably transmitted. Also, one or more back-up paths along different sets of IAB-nodes are defined that can be used in case a radio link failure (RLF) occurs on any link of the default path. A link is defined between two successive IAB-nodes in the backhaul network.

Another mechanism to provide data transmission robustness, e.g. in case of radio link failures, includes the PDCP (Packet Data Convergence Protocol) duplication mechanism, as described in the 3GPP specification document TS 38.323 (V16.1.0). Systematic duplication mechanism advantageously reduces latency compared to alternative robustness mechanisms such as the on-demand retransmission mechanism (in which each hop adds delays for requesting retransmission).

PDCP duplication involves the transmission of duplicated PDCP packets over two or more different carrier frequencies to increase diversity, through a single base station (called Carrier Aggregation duplication) or through different base stations (called Dual/Multi-Connectivity duplication).

The IAB is transparent to the PDCP protocol: the IAB-nodes do not have PDCP sublayer in the user plane. Consequently, the PDCP duplication is end to end, i.e. between the UE and the IAB-donor connected to the network core. The various intermediate IAB-nodes, if any, thus do not interact with the PDCP duplication mechanism.

PDCP-based robustness mechanism is not satisfactory.

Firstly, it concentrates and induces high processing loads at the emitter and receiver, i.e. at the IAB-donor and the UE.

In particular regarding the IAB-donor, as it is the only IAB-node connected to the core network, it handles all the data flows for all the UEs attached to the IAB network. It turns out that, should the PDCP duplication be activated, the IAB-donor faces an excessive load of a huge number of packets to process, in particular to duplicate in downlink and to remove duplicates in uplink.

Regarding an UE that experiences good quality link with its access IAB-node, an activation of the PDCP duplication (due to low quality of another link in the IAB network) requires the UE to perform un-needed processing. This extra processing load may be detrimental to low-resource UEs.

Secondly, it may significantly waste backhaul network bandwidth. Indeed, the PDCP duplication (activated due to a low quality link) involves the transmission of duplicated packets over multiple links between the IAB-donor and the UEs, including those links between IAB-nodes where the transmission quality is good.

More generally, more efficient and fairer robustness mechanisms are required.

SUMMARY OF THE INVENTION

The present invention proposes a communication method in a wireless network comprising an Integrated Access and Backhaul, IAB, network, the method comprising at an IAB-node:

- receiving Backhaul Adaptation Protocol, BAP, packets wearing the same BAP routing identifier. In the present document, BAP packets refer to BAP data packets that may carry either user plane or control plane data.
- using a BAP routing configuration to perform a BAP-sublayer operation determining, for the same BAP routing identifier, multiple Radio Link Control, RLC, channels for the received BAP packets, that belong to one or more egress links, and
- transmitting the BAP packets over the multiple RLC channels.

Such an IAB-node is called initiator.

Depending on the operation initiated by this IAB-node, the Integrated Access and Backhaul, IAB, node relaying Backhaul Adaptation Protocol, BAP, packets in an IAB network may be configured as an initiator for BAP packet duplication at BAP sublayer, or an initiator for BAP packet network encoding at BAP sublayer, or an initiator for a split, at BAP sublayer, of a BAP packet stream over multiple egress links.

Correspondingly, the present invention also proposes a communication method in a wireless network comprising an Integrated Access and Backhaul, IAB, network, the method comprising at an IAB-node:

- receiving, over one or more ingress links, Backhaul Adaptation Protocol, BAP, packets that are redundant to an original BAP packet,
- using a BAP routing configuration to perform a BAP-sublayer operation determining whether redundancy of the BAP packets ends at the IAB-node, and
- in case of positive determining, processing the redundant BAP packets to obtain the original BAP packet and transmit the single original BAP packet over an egress link or its content (of the BAP packet) to upper layers of the IAB-node.

Such an IAB-node is called terminator.

Depending on the operation terminated by this IAB-node, the Integrated Access and Backhaul, IAB, node relaying Backhaul Adaptation Protocol, BAP, packets in an IAB network may be configured as a terminator of BAP packet duplication at BAP sublayer, or a terminator of BAP packet network coding at BAP sublayer.

The above methods define a link-based robustness control, where the diversity of links or channels in the IAB network is used at IAB-node level.

A first IAB-node (initiator of the BAP-sublayer operation) transmits BAP packets using such diversity, for instance by duplicating BAP packets because of a low quality egress link. This first part of the operation in the IAB network advantageously distributes the processing load over multiple IAB-nodes where the links are of low quality, rather than over the sole UEs and IAB-donor.

A second IAB-node (terminator of the BAP-sublayer operation) in the IAB network, e.g. after the low-quality links, can terminate the use of the link diversity, for instance by discarding duplicates of the same original BAP packet. This second part of the operation advantageously limits the duplication of packets within a subpart of the IAB network, preferably where the BH links (between IAB-nodes) are of low quality. Bandwidth is thus not wasted on the part of the IAB network where the original BAP packets are transmitted without duplicates thereof.

In other words, the extra processing and the extra bandwidth consumption are now concentrated on the portion of the IAB network that really needs additional mechanisms to be resilient to radio link failure. Appropriate selection of the first and second IAB-nodes makes it possible to limit this portion.

Of course, the same mechanism can be implemented simultaneously in various portions of the IAB network, e.g. with respect to different packet streams and different low quality BH links.

These IAB-nodes may be configured by the IAB-donor CU of the IAB network. In this respect, an Integrated Access and Backhaul donor Central Unit, IAB-donor CU, of an IAB network may be designed to send configuration messages in order to configure IAB-nodes of the IAB network with respective Backhaul Adaptation Protocol, BAP, routing configurations, wherein one of the BAP routing configurations configures one IAB-node as an initiator of a BAP-sublayer operation, which transmits received BAP packets that wear the same BAP routing identifier, over multiple Radio Link Control, RLC, channels that belong to one or more egress links. In addition, another one of the BAP routing configurations may configure another IAB-node as a terminator of the same BAP-sublayer operation to process received redundant BAP packets into an original BAP packet and transmit the single original BAP packet over an egress link or its content to upper layers of the IAB-node.

Correlatively, the invention also provides a wireless communication device comprising at least one microprocessor configured for carrying out the steps of any of the above methods.

Optional features of embodiments of the invention are defined in the appended claims. Some of these features are explained here below with reference to a method, while they can be transposed into device features.

In some embodiments, transmitting the BAP packets includes obtaining BAP packets redundant to a received BAP packet and sending the redundant BAP packets over the multiple RLC channels. This defines a useful redundancy-based process in view of providing more network robustness on a subpart only of the network.

In some embodiments, the redundant BAP packets include the received BAP packet and one or more duplicates thereof. This means the IAB-node acts an initiator for a duplication mechanism, associated with a terminator IAB-node.

In particular embodiments, the method further comprises adding the same sequence number to the received BAP packet and the duplicates thereof. This addition marks or tags each duplicated BAP packets and allows the terminator IAB-node to easy identify them where the BAP-sublayer duplication mechanism should end.

In particular embodiments, when the received BAP packet already includes a sequence number, the received BAP packet and its duplicates keep the sequence number, without another sequence number being added. This may for instance happen when the duplication operation is nested within another redundancy-based operation on the BAP packets.

In some embodiments, obtaining the redundant BAP packets includes network encoding the received BAP packet. The network encoding may be made with the BAP packet alone (i.e. on segments segmenting it) or with another or more received BAP packets (which are thus combined). The IAB-node then acts as an initiator for a network coding mechanism, again associated with a terminator IAB-node.

In particular embodiments, the redundant BAP packets resulting from the network encoding of the same received BAP packet are tagged with successive sequence numbers. This again marks or tags the generated BAP packets to allow the terminator IAB-node to easy identify them where the BAP-sublayer network coding mechanism should end.

In some embodiments, a sequence number is added to the redundant BAP packets, and each sequence number has the following format:

k bits, and additional count bits incremented when processing (duplicating or network encoding) a newly received BAP packet to obtain redundant BAP packets, wherein the k bits are set to the same value when a processing on the received BAP packet to obtain the redundant BAP packets is a duplication process and the k bits are set to uniquely identify each redundant BAP packet when the processing is a network coding.

The same SN format can thus be used for the proposed redundancy-based BAP-sublayer operations, should them be simultaneously implemented in the same IAB network.

In some embodiments, the method further comprises determining, from the BAP routing configuration, whether a sequence number has to be added to the redundant BAP packets compared to the received BAP packet or not. It is thus possible, through IAB-node configuration, not to systematically add a SN.

From terminator perspective, embodiments related to the duplication operation provide that processing the redundant BAP packets includes determining duplicates of an original BAP packet and discarding duplicates to keep a single duplicate as the single original BAP packet.

In that case, determining duplicates may include identifying received BAP packets tagged with the same sequence number.

Embodiments related to the network coding operation provide that processing the redundant BAP packets includes network decoding them to obtain the original BAP packet.

In that case, receiving the redundant BAP packets may include identifying received BAP packets tagged with sequence numbers separate by less than a number of combinations defined by the network decoding.

In some embodiments, the method further comprises determining, from the BAP routing configuration, whether a sequence number has to be removed from the original BAP packet compared to the received redundant BAP packets or not.

Apart from the duplication and network coding operations, embodiments may provide that transmitting the BAP packets includes splitting a flow of the received BAP packets into multiple subflows and transmitting the multiple subflows of BAP packets over the multiple RLC channels respectively. This “split” operation thus provides balancing of usage of the BH links.

In some embodiments of the invention, multiple RLC channels belong to multiple egress links respectively. In a variant, the multiple RLC channels belong to one and the same egress link. In another variant, the multiple RLC channels include RLC channels belonging to one and the same egress link and one RLC channel belonging to a separate egress link.

In a particular embodiment, the BAP routing identifier comprising a BAP address of a destination IAB-node and a path identifier.

In some embodiments of the invention, the BAP routing configuration is received from an IAB-donor Central Unit of the IAB network. Decision on which IAB-nodes are initiators or terminators of some BAP-sublayer operations is thus centralized at the IAB-donor CU.

In some embodiments, the BAP routing configuration is received via a BAP configuration message of one of the following message types: BAP MAPPING CONFIGURATION message, UE CONTEXT SETUP REQUEST message and UE CONTEXT MODIFICATION REQUEST message, as defined in 3GPP TS 38.473 v16.2.0.

With respect of the configuration itself, some embodiments at an initiator provide that the BAP routing configuration includes a first configuration table made of entries each associating one BAP routing identifier with one BAP address of another IAB-node, wherein the entry corresponding to the BAP routing identifier of the received BAP packets further defines:

a BAP-sublayer operation to be performed to produce at least two packet subflows from the received BAP packets, and a list of routing items to determine the one or more egress links over which transmitting the packet subflows respectively.

The IAB-donor CU can thus clearly declare, through the BAP configuration tables, which IAB-node operates as an initiator.

In some embodiments related to this table, the list of routing items includes a list of BAP routing identifiers. In a variant, the list of routing items includes a list of BAP addresses of other IAB-nodes. In some embodiments, each routing item in the list corresponds to a respective packet subflow and defines the egress link over which transmitting the respective packet subflow.

Still with respect of the configuration itself, some embodiments at a terminator provide that the BAP routing configuration includes a first configuration table made of entries each associating one BAP routing identifier with one BAP address of another IAB-node, wherein the entry or entries corresponding to one or more BAP routing identifiers of the received BAP packets further define a BAP-sublayer operation to be performed to obtain the original BAP packet from the received redundant BAP packets.

In some embodiments, the first configuration table may include a first augmented table derived from the Backhaul Routing Configuration table as defined in 3GPP TS 38.300, V16.2.0, section 6.11.3.

In some embodiments, the BAP routing configuration includes a second configuration table made of entries each associating one egress link with one or more RLC channels.

An entry corresponding to a determined egress link may be associated with a plurality of RLC channels.

The entry may further include a triggering field defining one or more BAP routing identifiers for which the plurality of RLC channels is to be used.

A default RLC channel from the plurality may be used to transmit BAP packets of a routing identifier not specified in the triggering field.

The second configuration table may include a second augmented table derived from the BH RLC Channel Mapping Configuration table, the Uplink Traffic to BH RLC Channel Mapping Configuration table or the Downlink Traffic to BH RLC Channel Mapping Configuration table as defined in 3GPP TS 38.340, V16.1.0, section 5.2.1.4.

In a variant, the second configuration table is one (conventional) of the BH RLC Channel Mapping Configuration table, the Uplink Traffic to BH RLC Channel Mapping Configuration table and the Downlink Traffic to BH RLC Channel Mapping Configuration table as defined in 3GPP TS 38.340, V16.1.0, section 5.2.1.4.

Given the versatile nature of radio conditions in the IAB network, it may be advantageous for the IAB-donor CU to control when the BAP-sublayer operation is to be performed (e.g. poor network conditions local to some IAB-nodes) and when it should not (e.g. good overall network conditions).

In this respect, the initiator IAB-node may control to perform or not the BAP-sublayer operation based on a BAP-sublayer operation activation/deactivation command received from an IAB-donor Central Unit, IAB-donor CU, of the IAB network. In this scheme, the IAB-donor CU thus sends appropriate commands when needed.

In some embodiments, the initiator IAB-node may subsequently receive, from the IAB-donor CU, a BAP-sublayer operation activation/deactivation command deactivating the BAP-sublayer operation in such a way BAP packets subsequently received that wear said BAP routing identifier are not transmitted over multiple RLC channels. The initiator IAB-node, upon receiving the IAB-donor CU instructions, switches between applying the operation and not applying it, for instance for received BAP packets and subsequently received BAP packets that wear the same BAP Routing ID.

From terminator perspective, the terminator IAB-node may control to perform or not the BAP-sublayer operation based on a BAP-sublayer operation activation/deactivation command received from an IAB-donor Central Unit, IAB-donor CU, of the IAB network. In particular, the terminator IAB-node may subsequently receive, from the IAB-donor CU, a BAP-sublayer operation activation/deactivation command deactivating the BAP-sublayer operation in such a way redundant BAP packets subsequently received are not processed to obtain a single original BAP packet. Those redundant BAP packets may thus be merely forwarded to a next-hop IAB node.

From IAB-donor CU perspective, a BAP-sublayer operation activation/deactivation command may be sent to an IAB-node to activate or deactivate the BAP-sublayer operation for BAP packets to be received. Preferably, several commands are sent to initiators and terminators, being noted that the IAB-donor CU may control simultaneous BAP-sublayer operations on different subparts of the IAB network.

In some embodiments, the IAB-donor CU may establish at least one redundant egress path at the IAB-node before activating, at the IAB-node, a BAP-sublayer operation requiring two egress paths from the IAB-node.

In some embodiments, the BAP-sublayer operation activation/deactivation command is associated with at least one BAP routing identifier carried by the received BAP packets. This makes it possible to control the activation/deactivation at a Routing ID level, meaning a BAP-sublayer operation can be deactivated for some packet streams while it is simultaneously applied for other packet streams.

In other embodiments, one condition is associated with the BAP-sublayer operation, and the condition is to be met for respectively activating or deactivating the BAP-sublayer operation. Conditions may be used to activate the operation while other conditions may be used to deactivate the operation. This advantageously moves some processing (check of the conditions) to the IAB-nodes themselves, rather than having all of them at the IAB-donor CU.

In specific embodiments, the condition includes one or more of the following conditions:

- timing information defining when the BAP-sublayer operation is activated or deactivated,
- radio frame identifier defining from which radio frame including BAP packets the BAP-sublayer operation is activated or deactivated,
- BAP packet identifier defining from which received BAP packet the BAP-sublayer operation is activated or deactivated,
- BH link quality threshold defining from which link quality of an egress link the BAP-sublayer operation is activated or deactivated.

Of course, different times and identifiers can be provided to determine the start and the end of applying the BAP-sublayer operation.

The same threshold can be used to allow or not the BAP-sublayer operation to be applied: for a bad link quality (below the threshold), the operation is activated, while for a good link quality (above the threshold), the operation is deactivated.

In yet other embodiments, the condition is included in the BAP-sublayer operation activation/deactivation command. In a variant, the condition is provided in a message separate from the BAP-sublayer operation activation/deactivation command.

In some embodiments, the BAP-sublayer operation activation/deactivation command is according to one of the following message types: BAP MAPPING CONFIGURATION message, UE CONTEXT SETUP REQUEST message and UE CONTEXT MODIFICATION REQUEST message, as defined in 3GPP TS 38.473 v16.2.0. Hence, standardized messages are used.

In other embodiments, the BAP-sublayer operation activation/deactivation command is responsive to a status report sent by the addressee of the command. This allows the IAB-donor CU to take activation or deactivation decision based on information provided by the concerned IAB-node.

In particular embodiments, the status report reports a BH link quality level, hence the IAB-node may report quality of its egress BH links. In variants, the status report includes an explicit request for BAP-sublayer operation activation or deactivation. The IAB-node may have locally determined there is a need to perform the BAP-sublayer operation or a need to terminate a current one. This scheme advantageously moves processing load to the IAB-node.

In other particular embodiments, the status report includes an UL RRC MESSAGE TRANSFER message, as defined in 3GPP TS 38.401, section 8.2.4. Hence, standardized messages are used.

In yet other embodiments, the BAP-sublayer operation activation/deactivation command is included in one of the received BAP packets. This scheme is applied to BAP packets inserted in the IAB network at the IAB-donor. It advantageously does not require further messages. In addition, through a single (first) BAP packet, the IAB-donor CU may configure all the IAB-nodes concerned (initiator and terminator) to apply the BAP-sublayer operation for this BAP packets and following ones (up to a deactivation command or a deactivation condition is met).

In some embodiments, the received BAP packet further includes the BAP routing configuration defining the BAP-sublayer operation to be performed in case of BAP-sublayer operation activation. The BAP packet is thus self-sufficient to configure the concerned IAB-nodes for the BAP-sublayer operation according to the invention. In particular, the same BAP routing configuration in the received BAP packet may define the BAP-sublayer operation and identifies one IAB-node as initiator and another IAB-node as terminator for the BAP-sublayer operation. Preferably, the BAP-sublayer operation activation/deactivation command and the BAP routing configuration are included in a BAP header of the received BAP packet.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS

In an Integrated Access and Backhaul, IAB, network, an IAB-node is configured as an initiator for performing BAP-sublayer processing to the aim of transmitting BAP packets over multiple RLC channels. BAP-sublayer processing may duplicate a received BAP packet. The same sequence number is appended to all the duplicates to allow another IAB-node terminating the duplication to recognize them. In a variant, BAP-sublayer processing may network encode one received BAP packet. Successive sequence numbers are assigned to the resulting BAP packets to allow another IAB-node terminating the network coding to recognize them. A terminator of the BAP-layer processing thus terminates the duplication by discarding all duplicates except one or network decodes received packets with successive sequence numbers. Duplication process may be nested within another duplication or within a network encoding. This approach advantageously increases robustness of a wireless network, distributes the processing loads over multiple IAB-nodes and reduces bandwidth waste.

Figure 1:
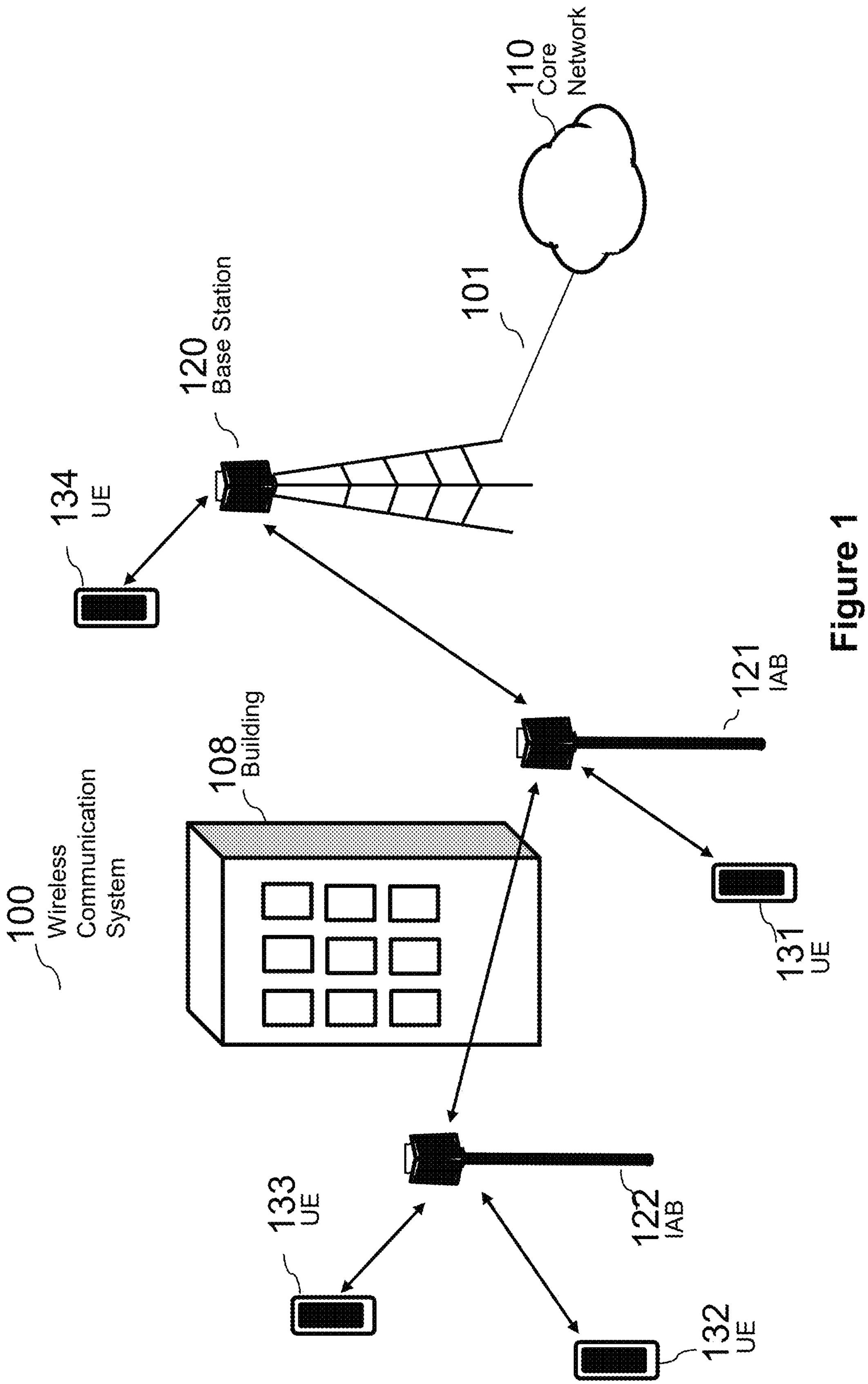
FIG. 1 illustrates a communication system in which the present invention may be implemented according to one or more exemplary embodiments.

FIG. 1 illustrates a communication system 100 in which the present invention may be implemented according to one or more exemplary embodiments.

As depicted, the exemplary system 100 is a wireless communication system, in particular a mobile radio communication system such as a fifth-generation (5G) New Radio (NR) system.

The system 100 comprises a plurality of UEs (User Equipment) 132, 133, 131 and 134, a remote core network 110, a main Base Station 120, and two Integrated Access and Backhaul (IAB) stations 121 and 122.

The main Base Station 120, also referred to as the IAB-donor 120, is connected to the core network 110 through a wired link 101, preferably an optical fiber or any other wired means. In one embodiment, IAB-donor 120 is a 5G NR gNB with additional functionality to support IAB features, as defined in 3GPP TS 38.300 v16.2.0 specification document.

In order to extend the network coverage of IAB-donor 120 and reach the remote UEs 132, 133 and 131, IAB stations 121 and 122, also referred to as IAB-nodes 121 and 122, have been installed by the operator. By acting as relaying nodes between the IAB-donor 120 and the UEs 132 and 133, IAB-nodes 121 and 122 allow overcoming the reachability issue resulting from presence of building 108, which is an obstacle to the propagation of radio waves and hence to the direct attachment and further communications between the UEs and the IAB-donor 120. This is particularly true when the communications between the IAB-donor 120 and UEs 132 and 133 are operated at millimeter wave frequencies, which are highly sensitive to shadowing phenomena.

The IAB-donor 120 also serves UE 134, which is directly connected to it.

The IAB-donor 120 and the IAB-stations 121 and 122 are thus forming a backhaul network, which accommodates UEs 132, 133, 131 and 134.

The specification of the Integrated Access and Backhaul (IAB) is spread over several 3GPP standard documents, including:

- TS 38.300 RAN architecture (V16.2.0),
- TS 38.321 MAC protocol (V16.1.0),
- TS 38.331 Radio Resource Control (RRC) protocol (V16.1.0),
- TS 38.340 Backhaul Adaptation Protocol Layer (V16.1.0),
- TS 38.401 RAN architecture (V16.2.0),
- TS 38.473 F1 Application Protocol (V16.2.0).

As IAB-nodes 121 and 122 are respectively connected to UEs 131, 132 and 133, they are considered as Access IAB-nodes for their respectively connected UEs.

The IAB-donor 120 is a logical node that provides the NR-based wireless backhaul and consists of a central unit (CU or gNB-CU functionality) and connected donor distributed unit(s) (DU or gNB-DU functionality). The IAB-donor CU and IAB-donor DU may be located far from the other. The gNB-DU functionality is defined in 3GPP TS 38.401. It aims at terminating the NR access interface to the UEs and next-hop IAB-nodes, and at terminating the F1 protocol to the IAB-donor gNB-CU functionality.

The IAB nodes, which may serve multiple radio sectors, are wireless backhauled to the IAB-donor 120, via one or multiple hops. They form a directed acyclic graph (DAG) topology with the IAB-donor at its root.

The IAB nodes consist of an IAB-DU and an IAB-MT (IAB-Mobile Termination). The gNB-DU functionality on an IAB-node is also referred to as IAB-DU and allows the downstream (toward the UE) connection to the next-hop IAB. The IAB-MT functionality includes, e.g., physical layer, layer-2, RRC and Non Access Stratum (NAS) functionalities to connect to the gNB-DU of an upstream IAB-node (including the IAB-donor 120 in which case it connects to the IAB-donor gNB-CU, hence to the core network 110, for instance for initialization, registration and configuration).

In this DAG topology, the neighbour node on the IAB-DU's interface is referred to as child node and the neighbour node on the IAB-MT's interface is referred to as parent node. The direction toward the child node is further referred to as downstream while the direction toward the parent node is referred to as upstream.

The IAB-donor 120 performs centralized resource, topology and route management for the whole IAB topology.

Figure 2:
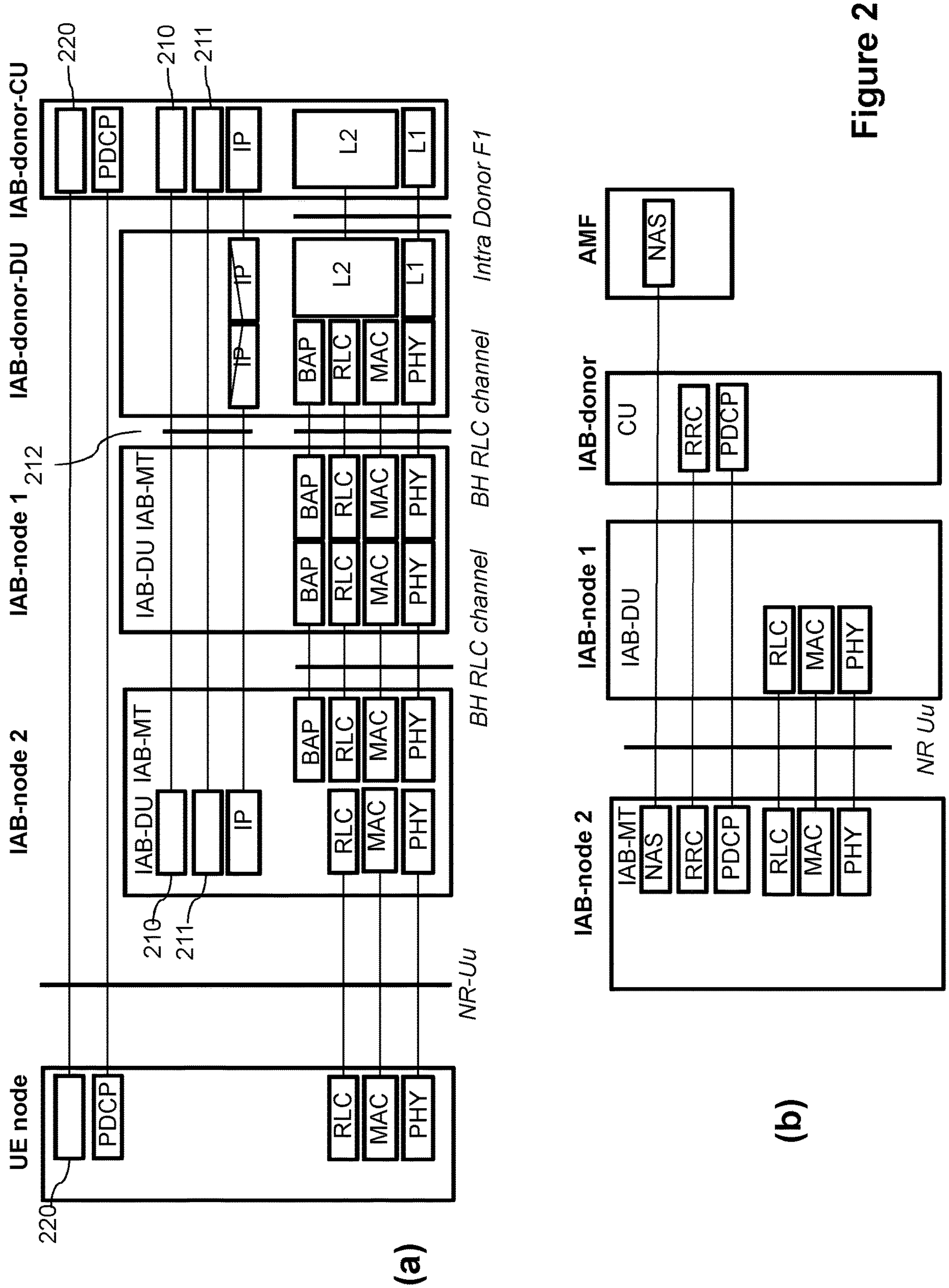
FIG. 2 schematically illustrates stacks of some protocol layers involved into IAB operations.

FIGS. 2*a* and 2*b* schematically illustrate stacks of some protocol layers involved into IAB operations.

F1 interface supports the exchange of signalling information between the endpoints, as well as the data transmission to the respective endpoints. From a logical standpoint, F1 interface is a point-to-point interface between the endpoints.

In 5G NR, F1-C is the functional interface in the Control Plane (CP) between the IAB-donor-CU and an IAB-node-DU. F1-U is the functional interface in the User Plane (UP) for the same units. F1-C and F1-U are shown by reference 212 in FIG. 2*a*. In this example, F1-U and F1-C are carried over two backhaul hops (from IAB-donor to IAB-node1 and then from IAB-node1 to IAB-node2).

In the User Plane, boxes 210 at the IAB-donor CU and the IAB-node DU refer to the GTP-U layer and boxes 211 refer to the UDP layer. GTP-U stands for GPRS Tunnelling Protocol User Plane. GTP-U Tunnels are used to carry encapsulated PDUs and signalling messages between a given pair of GTP-U Tunnel Endpoints (refer to 3GPP TS 29.281 for more details), here boxes 210 at the IAB-donor CU and the IAB-node DU. The well-known User Datagram Protocol (UDP) is a transport layer protocol providing a best effort datagram service and fit to use with an IP protocol.

In the Control Plane, boxes 210 indicate the F1AP (F1 Application Protocol) layer and boxes 211 indicate the SCTP (Stream Control Transmission Protocol) layer. The F1 Application Protocol (as defined in 3GPP TS38.473 and TS 38.450) provides signalling services between the IAB-donor CU and the IAB-node DU, or UE associated services. These services are for example initialization, configuration, and so on. The well-known SCTP layer provides reliable, in sequence transport of messages with congestion control.

F1-U and F1-C rely on an IP transport layer between the IAB-donor CU and the IAB-node DU as defined in 3GPP TS 38.450.

The transport between the IAB-donor DU and the IAB-donor CU also uses an IP transport Layer over various media, like for example wires or optical fiber when the IAB-donor CU is remote from the IAB-donor DU, or locally in a virtual instantiation of the IAB-donor CU and the IAB-donor DU on the same physical machine. IAB-specific transport between IAB-donor-CU and IAB-donor-DU is specified in 3GPP TS 38.401.

L1 and L2 on the Figure stand respectively for the transport and physical layers appropriate to the medium in use.

The IP layer can also be used for non-F1 traffic, such as Operations, Administration and Maintenance traffic.

On the wireless backhaul, the IP layer is itself carried over the backhaul adaptation protocol (BAP) sublayer, which enables routing over multiple hops. The BAP sublayer is specified in TS 38.340.

The IAB-DU's IP traffic is routed over the wireless backhaul via the BAP sublayer. In downstream direction, upper layer packets are encapsulated by the BAP sublayer at the IAB-donor DU, thus forming BAP packets or data units. The BAP packets are routed by the BAP layer (and corresponding BAP entities in the IAB-DU and IAB-MT) of the intermediate IAB-nodes, if any. The BAP packets are finally de-encapsulated by the BAP sublayer at the destination IAB-node.

In upstream direction, upper layer packets are encapsulated by the BAP sublayer at an access IAB-node, thus forming BAP packets or data units. The BAP packets are routed by the BAP layer (and corresponding BAP entities in the IAB-DU and IAB-MT) of the intermediate IAB-nodes, if any. The BAP packets are finally de-encapsulated by the BAP sublayer at the IAB-donor DU.

Figures 3, 3A:
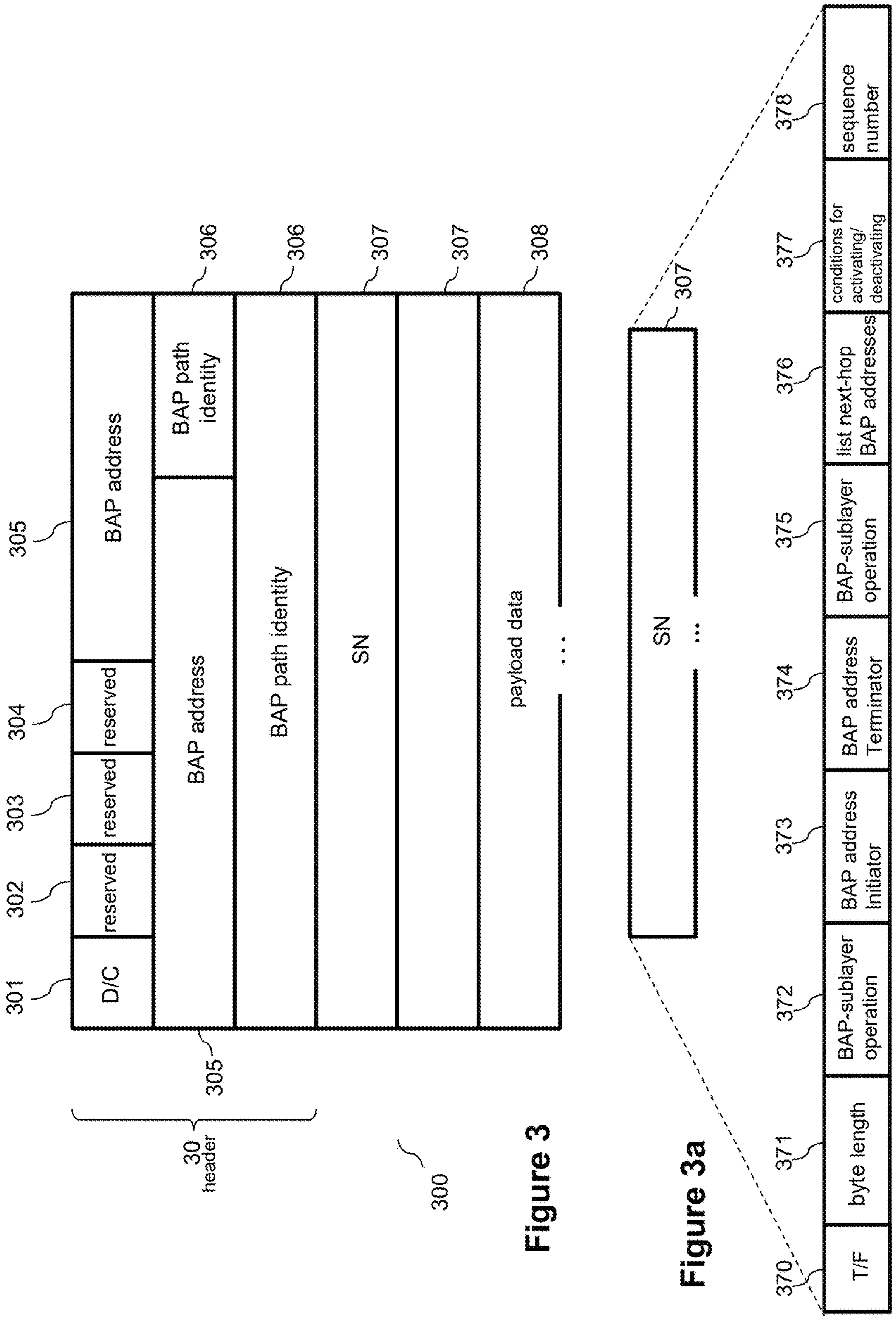
FIG. 3 illustrates the format of a BAP Protocol Data Unit (PDU) or packet.
FIG. 3*a* illustrates the format of field 307 of FIG. 3 in some embodiments.

On the BAP sublayer, packets are routed based on the BAP routing ID, which is carried in the BAP header. FIG. 3 illustrates the format of a BAP Data Protocol Data Unit (PDU) or packet. It is specified in the standardized version paragraph 6.2 of 3GPP TS38.340 release 16.1.0.

The header 30 includes of fields 301 to 306. Field 301, named D/C field, is a Boolean indicating whether the corresponding BAP packet is a BAP Data packet or a BAP Control packet. Fields 302-304 are 1-bit reserved fields, preferably set to 0 (to be ignored by the receiver).

Fields 305 and 306 indicate together the BAP routing ID for the BAP packet. BAP address field 305, also referred to as DESTINATION field, is located in the leftmost 10 bits while BAP path identity field 306, also referred to as PATH field, is located in the rightmost 10 bits.

Field 305 carries the BAP address (i.e. on the BAP sublayer) of the destination IAB-node or IAB-donor DU for the BAP packet. For the purpose of routing, each IAB-node and IAB-donor DU is configured (by IAB-donor CU) with a designated BAP address. Field 306 carries a path ID identifying the routing path the BAP packet should follow to this destination in the IAB topology.

The BAP header is added to the packet when it arrives from upper layers to the BAP layer, and it is stripped off by the BAP layer when it has reached its destination node. The selection of the packet's BAP routing ID is configured by the IAB-donor-CU.

For instance, when the BAP packet is generated by an IAB-node, i.e. either by the IAB-donor for downstream transmission or by an access IAB-node for upstream transmission, the BAP header with the BAP Routing ID is built by this IAB-node according to a configuration table defined in 3GPP TS 38.340. This table is called Downlink Traffic to Routing ID Mapping Configuration table in the IAB-donor or Uplink Traffic to Routing ID Mapping Configuration table in the access IAB-node. In intermediate IAB-nodes, the BAP header fields are already specified in the BAP packet to forward.

An use of these tables to perform the routing is described below with reference to FIG. 5.

To process the transport of messages over the 5G NR radio medium, three more sublayers (RLC, MAC and PHY) are implemented at each IAB-node below the BAP sublayer. The RLC (Radio Link Control) sublayer is responsible for the segmentation or reconstruction of packets. It is also responsible for requesting retransmissions of missing packets. The RLC layer is further described in TS38.322. The MAC (Media Access Channel) protocol sublayer is responsible for selecting available transmission formats for the user data and for the mapping of logical channel to the transport channels. The MAC handles also a part of the Hybrid Automated Repetition request scheme. The MAC layer is detailed in TS 38.321. On the emitter side, The MAC encapsulates the data packet issued from the RLC. It adds a header carrying information necessary to the MAC function. On the receiver side, The MAC decapsulates the data packet issued from the PHY, deletes its header and passes the remaining data to the RLC. The PHY sublayer provides an electrical interface to the transmission medium (the air) by converting the stream of information into physical modulation signals, modulating a carrier frequency at emitter side; at receiver side it converts the physical modulation signals back to a stream of information. The PHY layer is described in TS 38.201, TS 38.211, TS 38.212, TS 38.213, TS 38.214.

To pass messages above the BAP sublayer towards the user or control plane, two other sublayers are used: the PDCP (Packet Data Convergence Protocol) sublayer and either the SDAP (Service Data Adaptation Protocol) sublayer for the User Plane communications or the RRC (Radio Resource Control) sublayer for the Control Plane communications.

The PDCP sublayer handles IP Header compression/decompression, ciphering/deciphering, and handles the integrity on the data packet if necessary. It mandatorily numbers the packets on the emitter side and reorders the packets on the receiver side. The PDCP sublayer is described in 3GPP TS38.323.

SDAP sublayer 220 for the User Plane handles the Quality of Service. It is described in TS38.324. On the UE side, the SDAP sublayer exchanges the payload data with the user's application (voice, video, etc . . . —not shown in the Figure). On the IAB-donor side, the SDAP sublayer exchanges the data with the Core Network 110 (Internet traffic, Cloud, etc . . . ).

RRC sublayer 220 for the Control Plane handles the configuration of the protocol entities of the User Plane protocol stack. It is described in TS38.331. It is responsible for the handling of, inter alia, broadcasting information necessary to a UE to communicate with a cell; transmitting paging messages, managing connection, including setting up bearers; mobility functions; measurement configuration and reporting; devices capabilities.

The interface (for both CP and UP) between nodes using the layers PDCP, RLC, MAC and PHY is referenced NR-Uu. This mainly concerns the interface with the UE.

The interface (for both CP and UP) between nodes using the layers BAP, RLC, MAC and PHY is named BackHaul RLC Channel (BH RLC channel). This mainly concerns the interfaces between the IAB-nodes.

NR-Uu is the interface between the UE and the radio access network, i.e. its access IAB-node (for both CP and UP).

FIG. 2*b* comes from 3GPP TS 38.300 v16.2.0 and illustrates the protocol stack for the support of IAB-MT's RRC and NAS connections. The Non-Access Stratum (NAS) protocol handles the messages between the core network and a user equipment, here an IAB-node. It manages the establishment of communication sessions and maintains communications with the user equipment as it moves. The 5G NAS is described in 3GPP TS 24.501. The 5G Core Access and Mobility Management Function (AMF) is a function within the Core Network that receives all connection and session related information from the UEs connected to the IAB node, as well as similar information proper to the IAB-node. AMF is only responsible for handling connection and mobility management tasks.

The IAB-MT establishes signalling Radio Bearers SRBs (bearers carrying RRC and NAS messages) with the IAB-donor-CU. These SRBs are transported between the IAB-MT and its parent node(s) over NR-Uu interface(s).

Figure 4:
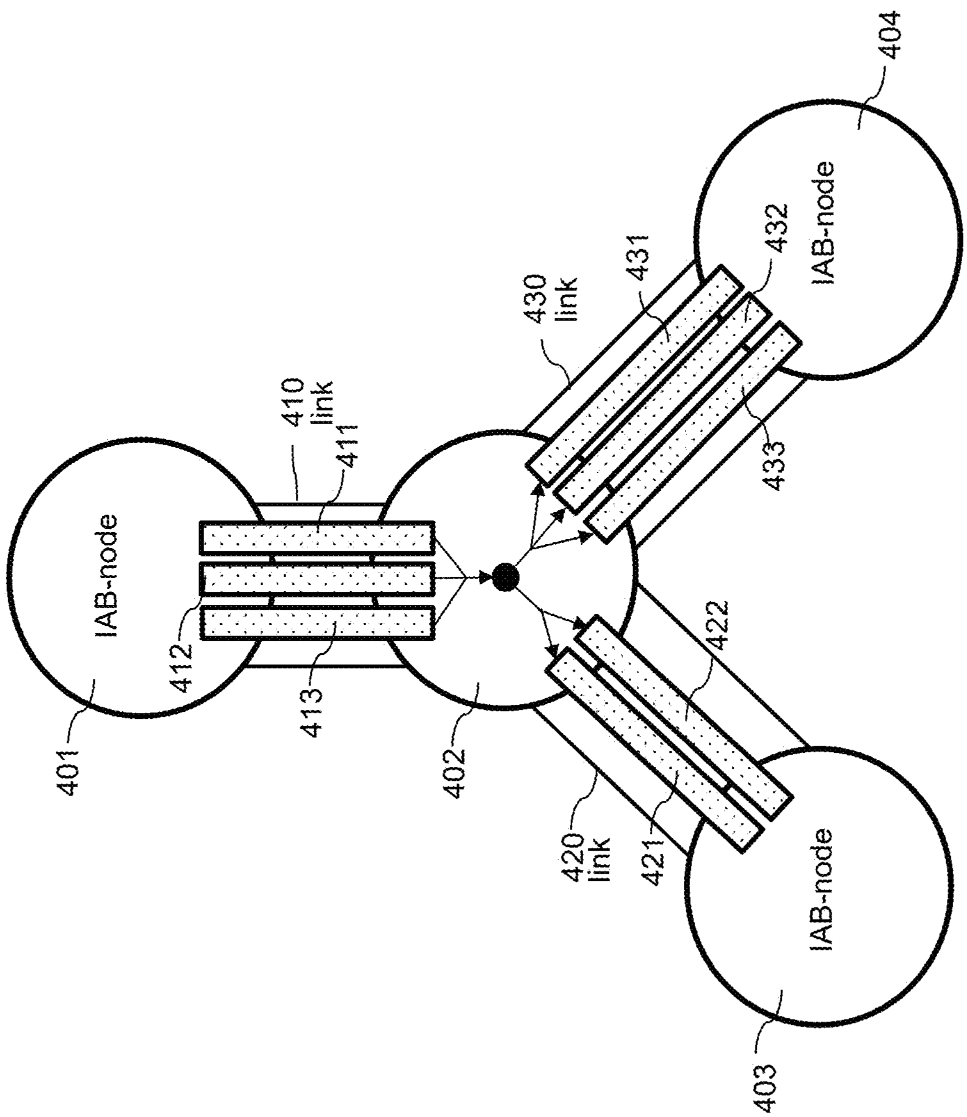
FIG. 4 illustrates the routing management in an IAB network.

FIG. 4 illustrates the routing management in an IAB network. The routing management at an IAB-node acting as relay is based on a BAP routing configuration and seeks to determine, from an ingress link over which a BAP packet is received, one BH RLC channel of one egress link for forwarding the received BAP packet.

A BAP routing configuration may be set manually in each IAB-node of the IAB network. Preferably, the BAP routing configurations are built and can be updated over time by IAB-donor CU and transmitted by same via F1AP signaling to the IAB-nodes during their initial configurations and the life of the IAB network.

Figure 5:
FIG. 5 illustrates routing tables in IAB-nodes according to 3GPP TS 38.300.

The BAP routing configuration of the IAB-node comprises various routing tables, two of which are shown in FIG. 5.

FIG. 5*a* schematically shows an entry 500 of the Backhaul Routing Configuration table as defined in 3GPP TS 38.300, V16.2.0, section 6.11.3 for the BAP sublayer. It is used by the IAB-node to select the egress link to forward or transmit a BAP packet or PDU (Protocol Data Unit).

Field 501 defines a BAP Routing ID (concatenation of the PATH and DESTINATION fields mentioned above) while field 502 specifies the next-hop BAP Address, i.e. the BAP address of the next IAB-node along the path corresponding to the Routing ID 501. The Next Hop BAP address 502 thus identifies an egress link to forward or transmit the BAP packet.

There may be several entries in the Backhaul Routing Configuration table with the same destination BAP address but with different Path IDs and next-hop BAP Addresses in the information element 502. The first entry may provide the default next-hop BAP Address corresponding to the default path to reach the destination, and the other entries with the same destination BAP address relate to back-up redundant paths to be selected when the default link is not available, e.g. because of radio link failure (RLF).

FIG. 5*b* schematically shows an entry 510 of the BH RLC channel mapping configuration table as defined in 3GPP TS 38.300, section 6.11.3 and/or 3GPP TS 38.340, V16.1.0, section 5.2.1.4.1, for the BAP sublayer. It is used by the IAB-node acting as a relay to identify the Backhaul (BH) RLC channel where to forward a BAP packet or PDU over the egress link previously selected using the Backhaul Routing Configuration table.

Information Element (IE) 511 stores a next-hop BAP address as defined previously and usually obtained from the Backhaul Routing Configuration table; IE 512 stores a prior-hop BAP address, i.e. the BAP address of the previous IAB-node from which the BAP packet arrives; IE 513 specifies an ingress RLC channel ID, i.e. the identifier of an RLC channel over which the BAP packet is received; and IE 514 stores an egress RLC channel ID providing the RLC channel the IAB-node will use to forward the BAP packet.

Note that for BH RLC channels in downstream direction (parent to child direction, e.g. IAB-node 402 towards IAB-node 403 in FIG. 4), the BH RLC channel ID is included in the F1AP configuration of the BH RLC channel. For BH RLC channels in upstream direction (child to parent direction, e.g. IAB-node 402 towards IAB-node 401), the BH RLC channel ID is included in the RRC configuration of the corresponding logical channel.

FIGS. 5*c* and 5*d* illustrates the equivalents to the BH RLC channel mapping configuration table for the IAB-node that does not act as intermediate IAB relaying entities. They are defined in 3GPP TS 38.340, sections 5.2.1.4.2. and section 5.2.1.4.3.

The table in FIG. 5*c* is called Uplink Traffic to BH RLC Channel Mapping Configuration table, 520. It is used by an IAB-node (not the IAB-donor) having built BAP packets or PDUs from BAP SDUs (Service Data Unit) received from upper layers, to identify the Backhaul (BH) RLC channel to transmit these packets in upstream direction over the egress link previously selected using the Backhaul Routing Configuration table described in FIG. 5*a*.

IE 521 specifies a Traffic Type Identifier for the SDUs received from the upper layers, IE 522 indicates a next-hop BAP address as defined previously and usually obtained from the Backhaul Routing Configuration table, and IE 523 specifies an egress BH RLC channel providing the RLC channel the IAB-node will use to transmit the BAP packet.

The table in FIG. 5*d* is called Downlink Traffic to BH RLC Channel Mapping Configuration table 530. It is used by an IAB-node having built BAP packets or PDUs from BAP SDUs (Service Data Unit) received from upper layers, to identify the Backhaul (BH) RLC channel to transmit these BAP packets in downstream direction over the egress link previously selected using the Backhaul Routing Configuration table.

IE 531 is an IPv6 flow label used to classify IPv6 flows, IE 532 specifies a DSCP (Differentiated Services Code Point) usually indicated in the IPv6 header of the packets, IE 533 indicates a destination IP Address, IE 534 indicates a next-hop BAP Address as defined above, and IE 535 defines an egress BH RLC channel ID providing the RLC channel the IAB-node will use to transmit the BAP packet.

The tables of FIGS. 5*b*, 5*c* and 5*d* may be composed of several rows (entries), each row/entry including the IEs shown in the respective Figures.

Next-hop BAP address and egress link are synonymous because they designate the same portion (link) of the IAB network between the current IAB-node and the next IAB-node having the next-hop BAP address. Consequently, they can be used indifferently to designate such IAB network link.

Back to FIG. 4, the routing of a BAP packet by the BAP sublayer of IAB-node 402 uses the BAP routing ID 305+306 of a BAP packet. The BAP address (DESTINATION path 305) used for the purpose of:

1) determining whether the BAP packet has reached the destination node, i.e. IAB-node or IAB-donor DU, on BAP sublayer. The BAP packet has reached its destination node if the BAP address 305 in the packet's BAP header matches the BAP address configured either via RRC on the IAB-node or via F1AP on the IAB-donor DU.
2) determining the next-hop IAB-node for the BAP packet that has not reached its destination. This applies to BAP packets arriving from a prior-hop IAB-node over the BAP sublayer or that have been received from upper layers.

For packets arriving from a prior-hop IAB-node or from upper layers, the determination of the next-hop IBA-node is based on the Backhaul Routing Configuration table 500.

The IAB-node 402 resolves the next-hop BAP address 502 to a physical backhaul link, being either link 420 or link 430. To that end, it seeks the entry in the table having field 501 matching the BAP Routing ID 305+306 of the BAP packet. Corresponding field 502 provides the next-hop BAP address.

The Backhaul Routing Configuration table may have multiple entries 500 with different BAP Routing IDs but with the same destination BAP address (meaning the BAP Path IDs are different). These entries may correspond to the same or different egress BH links. In case, the BH link matching the BAP Routing ID of the BAP packet experiences a radio link failure (RLF), the IAB-node may select another egress BH link (next-hop BAP address) based on routing entries with the same destination BAP address, i.e. by disregarding the BAP path ID. In this manner, a BAP packet can be delivered via an alternative path in case the indicated path is not available.

For instance, in case BH link 420 experiences a radio link failure, IAB-node 402 may select another BAP routing ID having the same destination BAP address but involving BH link 430 instead.

Next, the IAB-node 402 derives the egress BH RLC channel of the selected egress BH link, over which the BAP packet is to be transmitted or forwarded. To that end, the IAB-node 402 uses the BH RLC channel mapping configuration table or Uplink Traffic to BH RLC Channel Mapping Configuration table or Downlink Traffic to BH RLC Channel Mapping Configuration table depending on its role (intermediate relay IAB-node, IAB-node or IAB-donor transmitting in uplink or downlink direction)

For instance, for an intermediate relaying IAB-node, IEs 511, 512, 513 are the inputs and IE 514 is the output of the BH RLC channel look-up process: IAB-node 402 routes the incoming BAP packets received from the ingress BH RLC channel ID 513, belonging to the ingress BH link identified by the prior-hop BAP address 512, to the egress BH RLC channel ID 514, belonging to the egress BH link previously selected and now identified by the next-hop BAP address 511.

For an IAB-node wishing to transmit a BAP packet in upstream direction to the IAB-donor, IEs 521, 522 are the inputs and IE 523 is the output of the BH RLC channel look-up process: the IAB-node 402 selects the egress BH RLC Channel 523 corresponding to the table entry 520 where the Traffic Type Identifier 521 matches the traffic type of the original BAP SDU, and where the next-hop BAP address 522 matches the next-hop BAP address previously selected with the Backhaul Routing Configuration table. This applies for BAP SDUs in the control plane (non F1-U packets), as well as for BAP SDUs in the user plane (F1-U packets). The Traffic Type Identifier 521 shall correspond to the destination IP address and TEID (Tunnel End Point Identifier) of the BAP SDUs.

For the IAB-node (possibly IAB-donor) wishing to transmit a BAP packet in downstream direction to a destination IAB-node or an UE, IEs 531, 532, 533, 534 are the inputs and IE 535 is the output of the BH RLC channel look-up process: IAB-node selects the egress BH RLC Channel 535 corresponding to the table entry 530 matching the Destination IP address 533, the IPv6 Flow Label 531 (only for BAP SDU encapsulating an IPv6 packet), and the Differentiated Services Code Point (DSCP) 532 of the original BAP SDU, and where the next-hop BAP address 534 matches the next-hop BAP address previously selected with the Backhaul Routing Configuration table. This applies for BAP SDUs in the control plane (non F1-U packets), as well as for BAP SDUs in the user plane (F1-U packets).

In any case, if there is no matching entry, a default BH RLC ID channel is selected.

Such routing process can be implemented in the various IAB-nodes of an IAB network.

Figure 6:
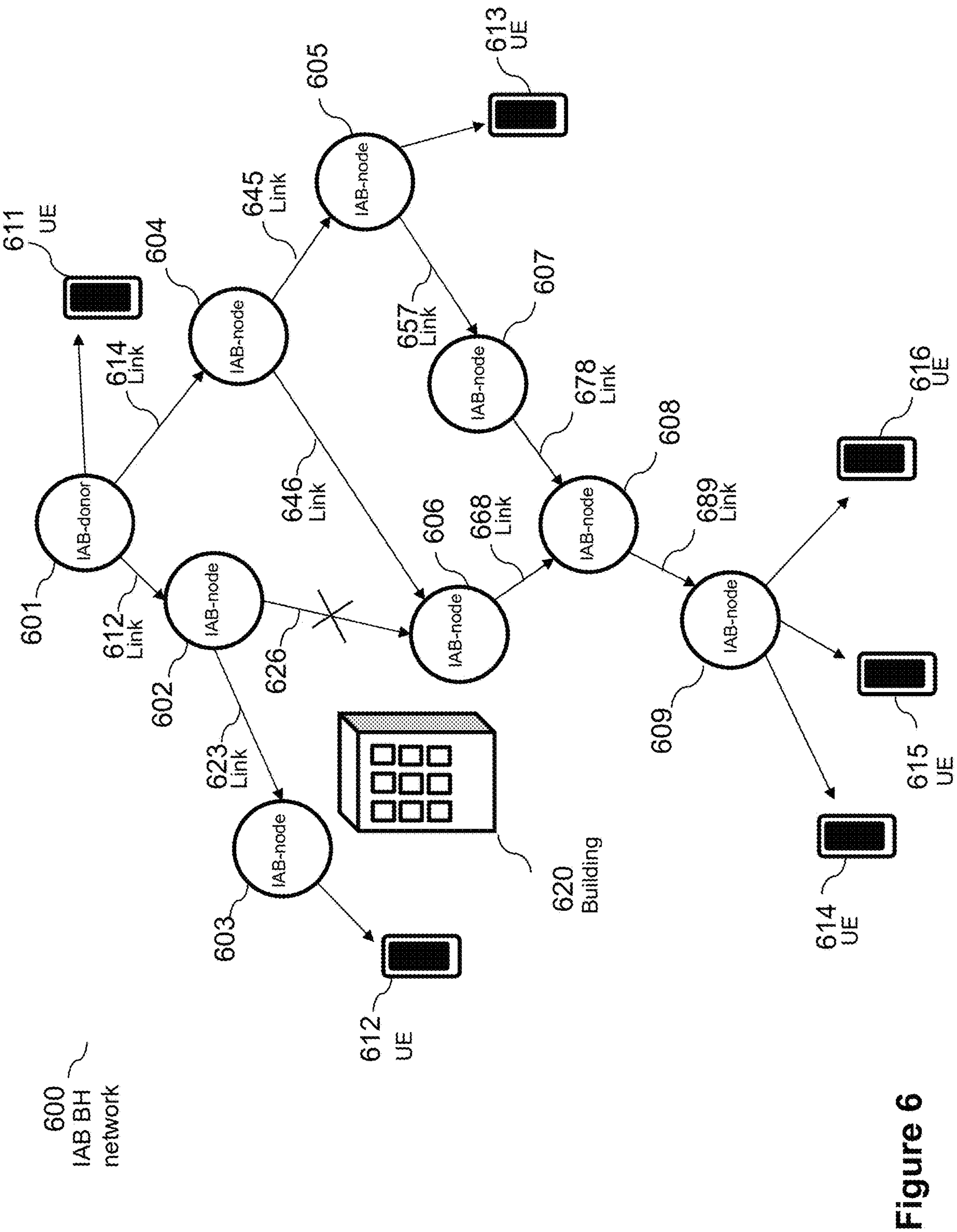
FIG. 6 illustrates an example of IAB network topology presenting network path diversity in which the present invention may be implemented according to one or more exemplary embodiments.

FIG. 6 illustrates an example of IAB network topology presenting network path diversity. In one embodiment, the BH radio are operated over the millimeter wave frequency band (i.e. above 30 GHz), which is highly sensitive to radio channel disturbance.

IAB BH network 600 is made of one IAB-donor 601, similar to IAB-donor 120, and a plurality of IAB-nodes 601, 602, 603, 604, 605, 606, 607, 608 and 609, similar to IAB-nodes 121 and 122. These IAB-nodes are connected through BH links 612, 614, 623, 626, 645, 646, 657, 668, 678 and 689.

As IAB-nodes 601, 603, 605, and 609 are respectively serving UEs 611, 612, 613, 614, 615 and 616, they also act as access IAB-nodes for the respective UEs.

Building 620 represents an obstacle to radio signal propagation, hence preventing the establishment of a BH link between IAB-node 609 and IAB-node 603.

Redundant paths exist from IAB-donor 601 to node 609, for instance a first default BAP path via IAB-nodes 602, 606, 608, a second BAP path that involves IAB-nodes 604, 606 and 608, and a third BAP path that involves IAB-nodes 604, 605, 607 and 608.

The radio link 626 between IAB-nodes 602 and 606 may experience radio link failure due to some unexpected interference or shadowing phenomena. The default BAP path may thus become unavailable. Only the second and third paths are then used.

The path redundancy improves data transmission robustness. Other robustness mechanisms are known.

For instance, if radio link 646 between IAB-nodes 604 and 606 experiences weaknesses due to interference of shadowing for instance, packet duplication with transmissions using the second and third paths is one way to improve reliability.

PDCP duplication, i.e. duplication of packets at the PDCP sublayer (shown in FIG. 2), is one existing mechanism. The PDCP duplication is performed between the IAB-donor 601 and the UEs 614, 615, and 616, meaning it is end to end.

A first drawback of the end-to-end approach is that the PDCP duplication-related processing for all the data flows is concentrated on the IAB-donor and the UEs only. This induces high loads of processing for them.

Furthermore, if the PDCP duplication is activated because a specific IAB-link experiences low quality, the whole IAB network must convey duplicates of packets. This induces bandwidth waste.

This is in this context that the present invention provides intra-IAB management of the BH links, i.e. a control at link level.

For instance, this makes it possible to perform packet duplication only on a portion (link or links) that experiences low quality in the IAB network. Consequently, the other parts of the IAB network do not convey the packet duplicates, hence bandwidth waste is reduced. Furthermore, the packet duplication processing is no longer concentrated on the IAB-donor and the UE. Rather it is moved to the specific IAB-nodes ending the above low quality portion where duplication is performed.

More generally, robustness mechanisms using network diversity can be provided specifically to a subpart of the IAB network, and no longer to the whole IAB network.

Still looking at FIG. 6, for instance IAB-node 604 may be configured according to embodiments of the invention to perform packet duplication at the BAP sublayer in order to duplicate a received BAP packet and forward the duplicates over both egress links 645 and 646. No duplication is performed before, i.e. a single copy of the BAP packet has been transmitted over link 614, hence network bandwidth in link 614 is not waste.

The duplicates can go through two different paths to reach IAB-node 608 (path 604-606-608 and path 604-605-607-608). IAB-node 608 may be configured according to embodiments of the invention to terminate the duplication process. In that case, all the duplicates are received by IAB-node 608 and only a single copy of the original BAP packet is forwarded over egress link 689 to access IAB-node 609 (or destination IAB-node).

Alternative to the packet duplication is the network coding that provides multiple BAP packets from an original BAP packet. The multiple BAP packets can be transmitted over egress links 645 and 646 by IAB-node 604, while IAB-node 608 receives all these packets and re-associate them (through network decoding) to recover the original BAP packet. A single copy of the original BAP packet is then forwarded over egress link 689 to access IAB-node 609 (or destination IAB-node).

Network coding is well known. Hence, no detailed description of a network coder and of a network decoder is given in this document.

The above example shows that the management of robustness at IAB-link level requires for one or more IAB-nodes to receive Backhaul Adaptation Protocol, BAP, packets wearing the same BAP routing identifier, to use a BAP routing configuration to perform a BAP-sublayer operation determining, from the same BAP routing identifier, multiple Radio Link Control, RLC, channels for the received BAP packets, that belong to one or more egress links, and finally to transmit the BAP packets over the multiple RLC channels. These IAB-nodes initiate the diversity-based mechanism for a subpart of the IAB network. They are called below initiators.

One or more other IAB-nodes (at the other end of the network subpart) are configured to receive, over one or more ingress links, Backhaul Adaptation Protocol, BAP, packets that are redundant to an original BAP packet, to use a BAP routing configuration to perform a BAP-sublayer operation determining whether redundancy of the BAP packets ends at the IAB-node, and in case of positive determining, to process the redundant BAP packets to obtain the original BAP packet and transmit the single original BAP packet over an egress link or its content to upper layers of the IAB-node. As these nodes end the diversity-based operations for the network subpart, they are called below terminators.

Depending on the direction of the data flow, an initiator IAB-node and a terminator IAB-node can be indifferently an access IAB-node, an intermediate relay IAB-node or even the IAB-donor DU. Also any IAB-node may simultaneously act as an initiator for one packet flow and as a terminator for another packet flow.

In embodiment, to ease the terminator IAB-node to identify the duplicates or to ease the terminator IAB-node to identify the various BAP packets to re-associate correctly through network decoding, a sequence number may be added by the initiator IAB-node to the BAP packets it transmits.

The configuration of the initiators and terminators can be static and performed manually, by a network operator or during IAB-node manufacturing process. In variants, their BAP routing configuration (used for the operations according to the invention) are preferably received from the IAB-donor central unit. A dynamic configuration can be provided, that may evolve over time. In addition, this approach can advantageously be based on the already-existing IAB-node configuration processes by the IAB-donor CU.

The BAP-sublayer operation may also be activated or deactivated on demand by the IAB-donor CU, as described with more details below.

The BAP routing configuration used for the operations according to embodiments of the invention includes the above Backhaul Routing Configuration, BH RLC channel mapping configuration, Uplink Traffic to BH RLC Channel Mapping Configuration and Downlink Traffic to BH RLC Channel Mapping Configuration tables that may be modified, where appropriate, with new fields.

Figure 7:
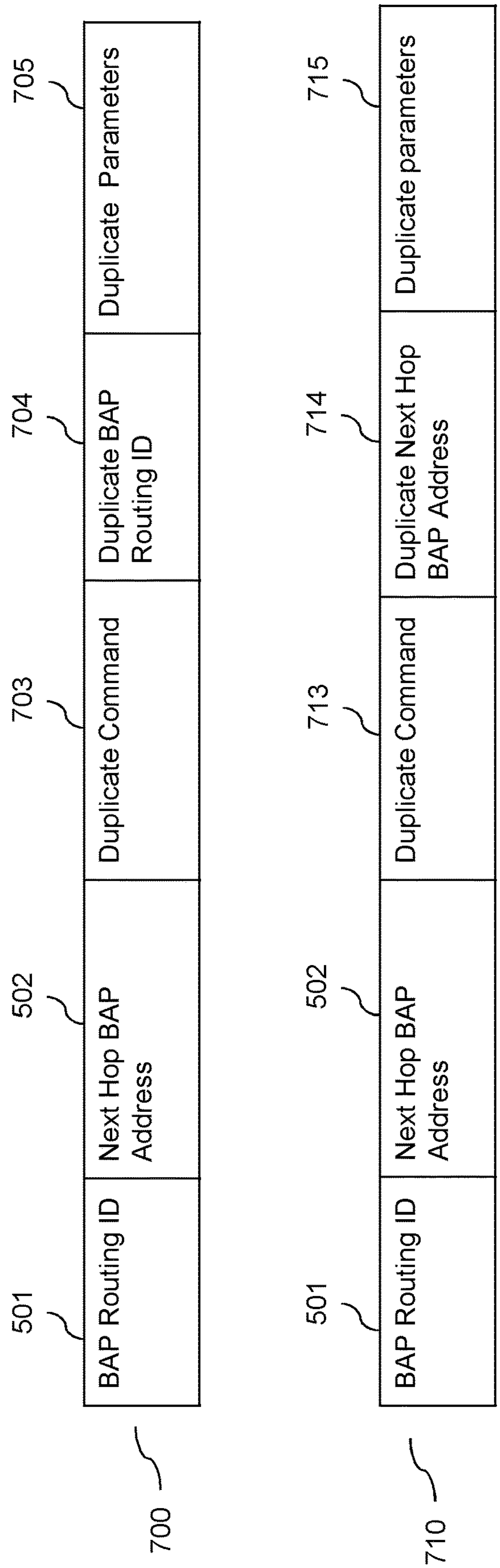
FIG. 7 illustrates augmented routing tables of a first type according to embodiments of the invention.
Figure 8:
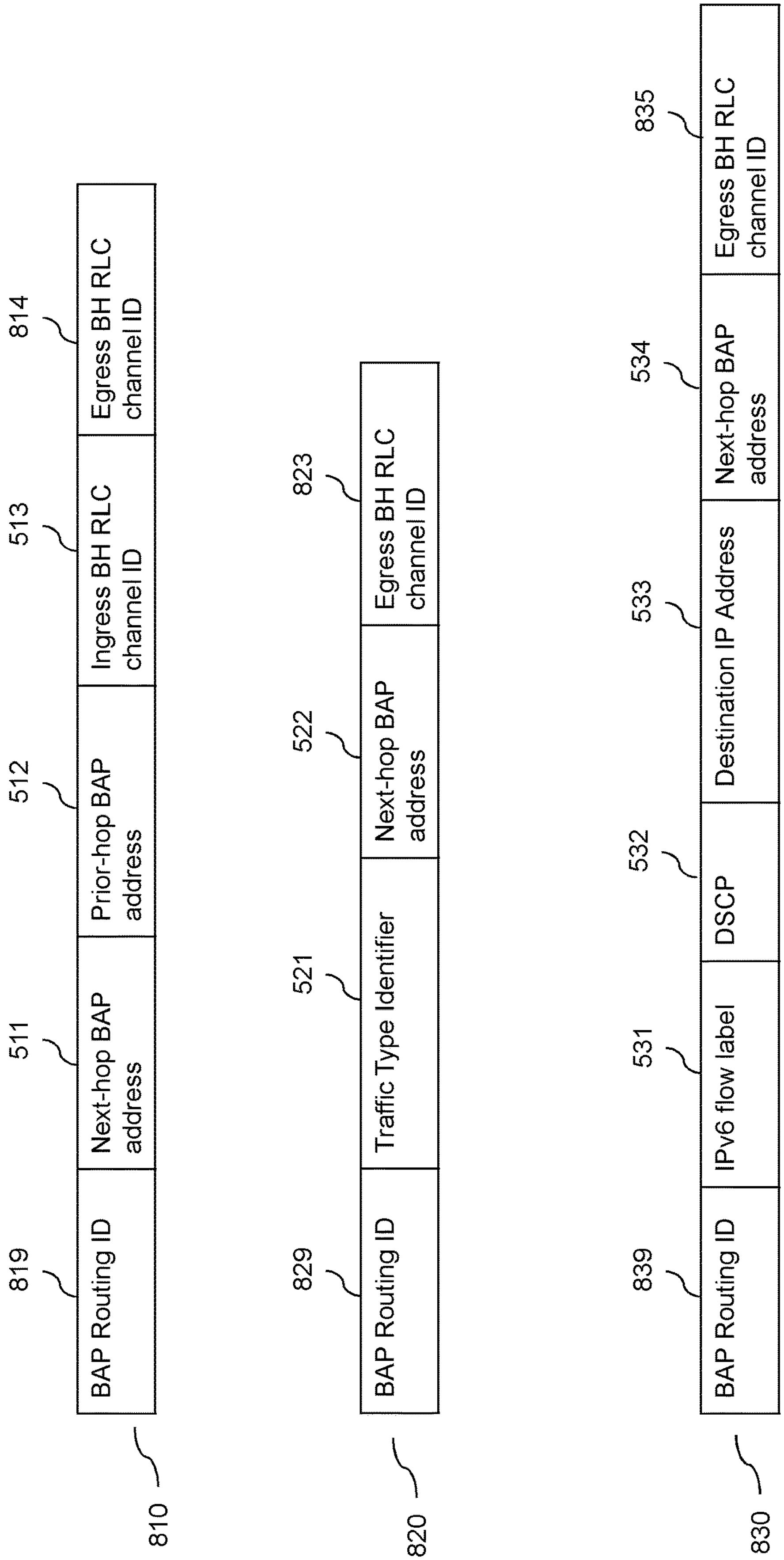
FIG. 8 illustrates augmented routing tables of a second type according to embodiments of the invention.

FIGS. 7 and 8 show resulting augmented tables according to embodiments of the invention.

FIG. 7 illustrates two alternate means for declaring initiators and terminators (if any) using the Backhaul Routing Configuration table of FIG. 5*a* as well as parameters to conduct the BAP-sublayer operation in an appropriate fashion. Those parameters may for instance define which data (packets) are concerned by the operation and how they have to be handled (choice of the IAB-links). As mentioned above, this augmented Backhaul Routing Configuration table may be part of a configuration provided by the IAB-donor CU to the IAB-node. This is because the IAB-donor CU has an overall view of the IAB network.

IEs 501 and 502 are the same as those of FIG. 5*a*.

The entry 700 of the augmented Backhaul Routing Configuration table further includes IE 703, IE 704 and IE 705.

IE 703, referred to as Duplicate Command IE, indicates to the IAB-node configured with this table, a BAP-sublayer operation to be performed when processing incoming BAP packets, the BAP header of which indicating a Routing ID value matching BAP Routing ID IE 501. IE 703 thus indicates, throughout the multiple entries 700 provided in the table, for which data flow (BAP Routing ID) a BAP-sublayer operation is to be performed.

The value taken by IE 703 may also indicate whether the IAB-node having to perform the BAP-sublayer operation is initiator or terminator of the mechanism.

In one embodiment, the BAP-sublayer operation is based on redundant packet transmission. It means that for an initiator, packets redundant to a received BAP packet are obtained and the redundant BAP packets are then sent over the multiple RLC channels. In that case, a terminator can be defined where BAP packets that are redundant to an original BAP packet are received and then processed to obtain the original BAP packet. Only the original BAP packet is then transmitted over an egress link or its content to upper layers of the IAB-node.

Redundancy of packets may be mere copy or duplication of the received (original BAP packet). In that case, the redundant BAP packets to transmit include the received BAP packet and one or more duplicates thereof.

Redundant BAP packets may alternatively be the result of a network encoding of the received BAP packet. This may be made with the BAP packet alone (e.g. by segmenting it and combining the resulting segments) or with one or more other received BAP packets (which are thus combined). It means for the terminator that the processing of the redundant BAP packets includes network decoding them to obtain the original BAP packet.

Network coding implements for instance multiple linear combinations (including the identity) of two packet flows to obtain more combined output flows. At the receiver side (here a terminator), the combination (decoding) of any two received flows makes it possible to retrieve the original two packet flows. The multiple linear combinations (for encoding and decoding) can be represented as a matrix.

In another embodiment, the BAP-sublayer operation merely involves splitting an incoming packet flow over multiple egress links. This aims at reducing the local bandwidth use of the BH links. In that case, the initiator splits a flow of the received BAP packets into multiple (usually two) subflows and transmits the multiple subflows of BAP packets over the multiple RLC channels respectively. No terminator is needed for this splitting operation. All the BAP packets will be received at the end side (i.e. destination IAB-node).

These BAP-sublayer operations all produce at least two packet subflows from the received BAP packets: duplicate flows, combined output flows or split subflows.

The BAP-sublayer operations can be combined and/or repeated.

For instance, a combined output flow (from network encoding) can be split or duplicated over multiple RLC channels and then decombined (network decoded) in a terminator IAB-node.

Also packets duplicated over a subpart of the IAB network can be duplicated again fora nested sub-subpart of the IAB network, for instance if higher robustness is required for this nested network sub-subpart.

Also, the IAB network may implement and authorize (through configuration) only a subpart of these possible BAP-sublayer operations.

IE 704, referred to as Duplicate BAP Routing ID, has a different meaning depending on whether the IAB-node is initiator or terminator.

For an initiator, IE 704 indicates a list of routing items to determine one or more egress BH links over which transmitting the multiple generated packets. In the particular case of entry 700, IE 704 may comprise one or more BAP Routing IDs over which transmitting the BAP packets resulting from the BAP-sublayer operation. The list of BAP Routing IDs may define which Routing ID to be used for each subflow produced by the BAP-sublayer operation: duplicate flows, combined output flows or split subflows. In particular, each routing item in the list 704 corresponds to a respective packet flow/subflow and defines the egress BH link over which transmitting the respective packet flow/subflow.

For a terminator, IE 704 may indicate the list of BAP Routing IDs over which the received duplicates or combined flows have been transmitted. This list may exclude BAP Routing ID of IE 501. This is for the terminator yet receiving a BAP packet wearing the BAP routing ID of 501 to efficiently search for its redundant BAP packets thanks to the BAP routing IDs of IE 704 in order to process them and retrieve the original BAP packet or packets.

IE 705, referred to as Duplicate Parameters, provides necessary parameters, if any, to perform the BAP-sublayer operation specified in IE 703.

Through the filling (by IAB-donor CU) of IEs 703-705 in the Backhaul Routing Configuration table entries, any IAB-node becomes aware for which BAP packet flows (BAP Routing IDs 501) it has to perform a BAP-sublayer operation or not, and where appropriate, whether it has to act as an initiator or a terminator.

Of course other schemes can be envisioned: for instance where only a single duplicate is produced, the original BAP packet may be tagged with SN=2n while its duplicate is tagged with SN=2n+1.

For instance, the SN is inserted in field 307 of the BAP packet, shown as a 2-byte field in FIG. 3. Field 307 may belong to the header (just before payload data 308 of variable length) of the BAP packet. Its presence is signaled in the BAP header: for instance bit 302 is used to signal, from the BAP header, whether a SN (field 307) is provided (bit set to 1) in the BAP Data PDU or not (bit set to 0).

Table 1 illustrates exemplary entries 700 for a duplicate initiator.

TABLE 1

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 606 | Duplicate Initiator | [Routing ID1, Routing ID2] | Sequence Number Insertion = True |
| Routing ID2 (DESTINATION = BAP Address of IAB-node 609, PATH2) | BAP Address of IAB-node 605 | None | | |

Duplicate Command IE 703 may thus take various values. In embodiments, it may takes one of the following values: "Duplicate Initiator" value, "Duplicate Terminator" value, "Network Coding Initiator" value, "Network Coding Terminator" value, "Split Initiator" value or null value if the IAB-node behaves in a transparent mode (i.e. without applying a BAP-sublayer operation) for BAP packets matching the BAP Routing ID of IE 501.

The duplication operation is driven by the "Duplicate Initiator" value signaling the initiator for the duplication and the "Duplicate Terminator" value signaling the terminator for the duplication.

When Duplicate Command IE 703 takes the "Duplicate Initiator" value for a given BAP Routing ID (of incoming packets), it indicates the concerned IAB-node has to act as the initiator for the duplication operation. The IAB-node thus has to start duplicating the incoming BAP packets in view of transmitting then as defined in the other IEs, in particular IE 704 listing the BAP Routing IDs for the transmission.

IE 705 includes a Sequence Number Insertion Boolean information, which indicates whether the IAB-node has to insert a sequence number (SN) in the duplicated BAP packets or not. The Sequence Number Insertion Boolean information is optional: the IAB-node may know, separate from the BAP routing configuration, that a SN is to be added in case duplication (or another BAP-sublayer operation) is activated.

The SN is used to tag the duplicate packets so that the terminator IAB-node can easily retrieve the duplicates of the same original BAP packet from all the receives BAP packets and suppress them to only forward the original BAP packet once.

Preferably, the same SN is indicated in all the outgoing BAP packets generated from the same original BAP packet. SN may be increased by one for each new incoming BAP packet to be duplicated.

This table configures IAB-node 604 as a Duplicate initiator with two outgoing duplicated BAP packets (the number of Routing IDs declared in list 704) for packets dedicated to Routing ID1 (501) and with the insertion of a sequence number (705).

PATH1, going through IAB-nodes 606 and 608, is the default path to be used regardless of the duplication being activated or not by IE 703, while PATH2, going through IAB-nodes 605, 607, and 608, is the second path to be used when the duplication is activated by IE 503 ("Duplicate Initiator" value). Assuming the quality of BH link 646 between IAB-nodes 604 and 606 is poor, then BAP packet duplication at IAB-node 604 is advantageous to prevent the IAB network from service interruption due to packet loss or potential RLF on this link.

The incoming BAP packets with a Routing ID corresponding to field 501 shall be duplicated at this IAB-node into a number of duplicates corresponding to the number of Routing IDs in list 704 (2 in the above example). An outgoing duplicated BAP packet is the exact copy of the incoming BAP packet, except for its BAP header which may differ for instance to specify a corresponding Routing ID of list 704. The resulting outgoing duplicated BAP packets are transmitted over one or several egress links, those corresponding to the Routing IDs of list 704, i.e. to the next-hop BAP addresses 502 corresponding to these Routing IDs (when indicated in 501).

In the example above, incoming BAP packets with Routing ID1 in their header should be duplicated once by IAB-node 604 to obtain two identical outgoing BAP packets, except for their BAP header, one being set to Routing ID1 and the other to Routing ID2. The two outgoing BAP packets are transmitted by the IAB-node over two egress BH links: the first one with Routing ID1 over BH link 646 to IAB-node 606 as apparent from field 502 (for Routing ID1 entry) and the second one with Routing ID2 over BH link 645 to IAB-node 605 as apparent from field 502 (for Routing ID2 entry). Indeed, the Backhaul Routing Configuration table shall contain additional entries—i.e. one for Routing ID2—to indicate to the IAB-node the next-hop BAP Address, and therefore the egress BH link, associated with the new Routing IDs.

indicates the IAB-node whether the SN has to be removed or not in the outgoing BAP packets.

Table 2 illustrates exemplary entries 700 for a duplicate terminator.

TABLE 2

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 609 | Duplicate Terminator | [Routing ID2] | Sequence Number Removal = True |
| Routing ID2 (DESTINATION = BAP Address of IAB-node 609, PATH2) | BAP Address of IAB-node 609 | Duplicate Terminator | [Routing ID1] | Sequence Number Removal = True |

In another example where list 704 is [Routing ID1, Routing ID2, Routing ID2, Routing ID3], three duplications are performed to obtain four outgoing BAP packets transmitted by the IAB-node over three egress BH links: the first one with Routing ID1 over BH link 646 to IAB-node 606, the second and third ones with Routing ID2, over BH link 645 to IAB-node 605 and the fourth one with Routing ID3 over another BH link to another IAB-node (not shown).

Again, all the outgoing BAP packets corresponding to the same original incoming BAP packet are given the same SN for instance.

When Duplicate Command IE 703 takes the "Duplicate Terminator" value for a given BAP Routing ID (of incoming packets), it indicates the concerned IAB-node has to act as the terminator for the duplication operation. The IAB-node thus has to terminate the forwarding of duplicates and either forward only one single copy (original BAP packet) over a single egress BH link (case of intermediate IAB-nodes) or de-capsulate the BAP packet to transmit a single SDU packet to the upper layers (case of destination IAB-node). In any case, the IAB node shall check the Backhaul Routing Configuration table even though the BAP packet is to be transmitted to a locally attached UE. In one embodiment of the invention, the single egress BH link is the one identified by the PATH field of the BAP Routing ID 501.

To help the IAB-node to retrieve the duplicates, IE 704 contains the list of the other Routing IDs (sometimes a single one) used for the duplicates of the same original BAP packet.

Furthermore, thanks to the value of bit 302, the IAB-node knows whether a SN is provided in a received BAP packet. By retrieving the SN field 307 of the various received BAP packets, the IAB-node is able to detect the duplicates that wear BAP routing ID 501 or one of list 704.

For instance, the received BAP packets with the same SN are duplicates of the same original BAP packet.

In a variant of sequence numbering by the initiator (introduced above), received BAP packets with SN=2n and 2n+1 are considered as duplicates of the same original BAP packet.

The usefulness of the SN is mainly for the terminator to easily identify the duplicates. Consequently, the SN can be generally removed from the header of the obtained original BAP packet, before it is transmitted to the next-hop IAB-node. Some situations described below may require not removing the SN. Therefore, IE 705 may comprise a Sequence Number Removal Boolean Information which This table configures IAB-node 608 as a Duplication Terminator IAB-node with the duplication to be removed among the incoming BAP packets with Routing ID1 and Routing ID2 specified in their header. In all cases, the remaining BAP packets (i.e. the original BAP packets) after duplicate removal are transmitted to the egress BH link 689 between IAB-nodes 608 and 609.

In one embodiment of the invention, the header of the remaining BAP packets (some may still specify Routing ID2) are all updated to the initial value Routing ID1 or to a default Routing ID (e.g. Routing ID1). Indeed, all the remaining BAP packets have to be transmitted over a single egress link, meaning they all preferably have to be assigned to the same Routing ID for outgoing process.

In the example above, incoming duplicate BAP packets received by IAB-node 608 with Routing ID1 or Routing ID2 in their header shall be filtered so as to transmit a single copy of the original BAP packet over single egress BH link 689 identified by IE 502 (or to the upper layers if the IAB node is the destination), while the other incoming duplicate BAP packets are discarded. To perform this operation, the IAB-node 608 may use the sequence number inserted in the BAP header field 307 to identify the incoming duplicated BAP packets. Two BAP packets tagged with the same sequence number represent the same original BAP packet despite their different Routing ID values and the fact that they may be received from two different ingress BH links.

No Parameters 705 is necessary in this case.

This example clearly shows that, thanks to the invention, the duplication of BAP packets is fully controlled between IAB-nodes 604 and 608, without impacting bandwidth usage of other links (such as BH links 614 and 689) with duplicated packets.

The conditional insertion of the sequence number (thanks to the Sequence Number Insertion Boolean information) allows the duplication operation to be performed successively at different initiator IAB nodes. When a second initiator IAB-node receives a BAP packet which is already resulting from a duplication at a first initiator IAB-node, the BAP packet header already contains a SN as described above. Therefore, when performing the second duplication operation, the second initiator IAB-node knows from the Sequence Number Insertion Boolean information that it should not insert a new sequence number. Preferably, it does not modify the existing sequence number. Indeed, all the duplicates (resulting from one duplication operation or two or even more successive duplication operations) have the same SN. It is therefore easy for any terminator IAB-node to detect them from incoming BAP packets In a variant, the insertion of the SN is not indicated in the Backhaul Routing Configuration table (i.e. no Sequence Number Insertion Boolean information is provided). In that case, the initiator IAB-node determines, when analyzing the header of the BAP packet to duplicate, whether a sequence number is present (thanks to bit 302 for instance) and may act accordingly, i.e. keep the existing SN for the new duplicates, or insert a SN if the incoming BAP packets were not yet duplicated. This approach reduces the processing at the second initiator IAB-node since it can skip the sequence number insertion.

Back to FIG. 6 where BH link 626 between IAB nodes 602 and 606 can now be reused, IAB-donor 601 may perform a first duplication with two copies of BAP packets transmitted via BH links 612 and 614. The generated duplicates thus wear the same SN according to the process described above.

Next, IAB-node 604 may be configured as a Duplicate Initiator too, hence it performs another duplication with two copies of any received BAP packet. The duplicates are then transmitted via BH links 646 and 645 to respectively IAB-nodes 606 and 605. Their SNs are not changed.

Table 1a illustrates exemplary entries 700 configuring initiator IAB-donor 601.

TABLE 1a

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 602 | Duplicate Initiator | [Routing ID1, Routing ID2] | Sequence Number Insertion = True |
| Routing ID2 (DESTINATION = BAP Address of IAB-node 609, PATH2) | BAP Address of IAB-node 604 | None | | |

As described above, IAB-donor 601 acts as a Duplicate Initiator generating two outgoing duplicated BAP packets and adding the same SN to their BAP header (because Sequence Number Insertion Boolean information is set to True). One is then assigned to PATH1 (default path), going through IAB-nodes 602, 606 and 608 until IAB-node 609. It is transmitted by IAB-donor 601 over BH link 612 to next-hop IAB-node 602. The other outgoing BAP packet is assigned to PATH2, going through IAB-nodes 604, 606 and 608 until IAB-node 609. It is transmitted by IAB-donor 601 over BH link 614 to next-hop IAB-node 604.

Table 1 b illustrates exemplary entries 700 configuring initiator IAB-node 604.

TABLE 1b

| 501 BAP Routing ID | 502 Next Hop BAP Address | 703 Duplicate Command | 704 Duplicate BAP Routing ID | 705 Duplicate Parameters |
|---|---|---|---|---|
| Routing ID2 (DESTINATION = BAP Address of IAB-node 609, PATH2) | BAP Address of IAB-node 606 | Duplicate Initiator | [Routing ID2, Routing ID3] | Sequence Number Insertion = False |
| Routing ID3 (DESTINATION = BAP Address of IAB-node 609, PATH3) | BAP Address of IAB-node 605 | None | | |

IAB-node 604 acts as a Duplicate Initiator generating two outgoing duplicated BAP packets from the BAP packets incoming from IAB-donor 601 that are assigned to PATH2 (i.e. Routing ID2). These incoming BAP packets already include a SN.

As the Sequence Number Insertion Boolean information is set to False, initiator IAB-node 604 knows that it does not have to include a SN but should keep the SN of the incoming BAP packets. One of the generated duplicates is then assigned to PATH2, going through IAB-nodes 606 and 608 until IAB-node 609. It is transmitted by IAB-node 604 over BH link 646 to next-hop IAB-node 606. The other outgoing BAP packet is assigned to PATH3, going through IAB-nodes 605 and 608 until IAB-node 609. It is transmitted by IAB-node 604 over BH link 645 to next-hop IAB-node 605.

Also, IAB-node 606 may be configured as a Duplicate Terminator, for instance because BH link 668 is of high quality. IAB-node 608 may be configured as a Duplicate Terminator too, in order to provide IAB-node 609 with only one copy of each original BAP packet.

Table 2a illustrates exemplary entries 700 configuring terminator IAB-node 606.

duplicates from among the BAP packets incoming from IAB-nodes 606 and 605, thanks to their identical SN. It then discards the duplicates to only keep one copy and removes, therefrom, the SN (field 307 is emptied and bit 302 is set to 0). The single copy is then transmitted to the next-hop IAB-node of PATH1, i.e. to IAB-node 609 over BH link 689.

This example shows that IAB-donor CU can configure the various IAB-nodes to allow nested duplications, where the duplicates are efficiently discarded to forward, at the end, only a single copy of the original BAP packet.

Figure 10:
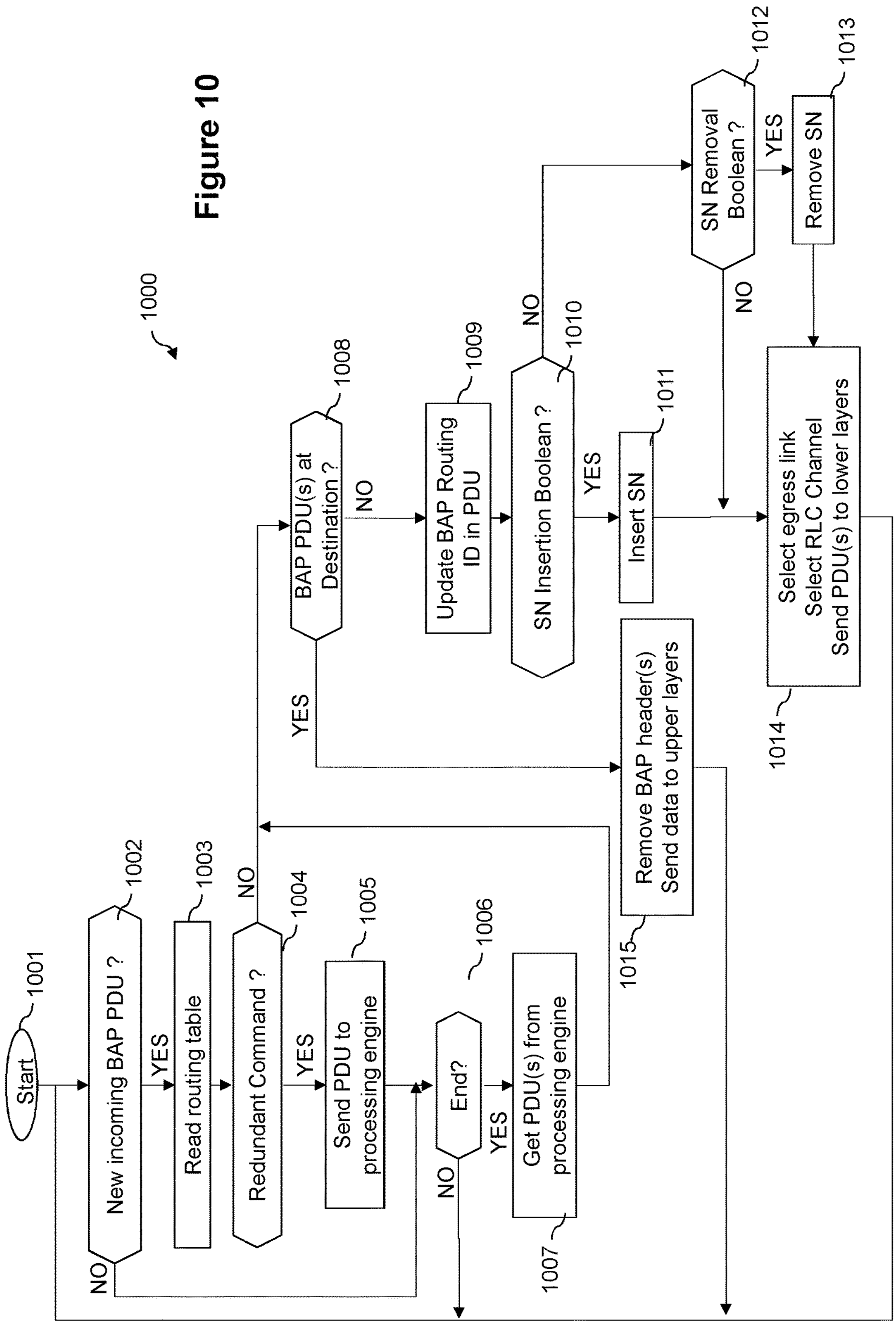
FIG. 10 illustrates, using a flowchart, an exemplary method for managing sequence numbering of BAP packets, according to embodiments of the invention.

Management of the SNs (insertion and removal) is exemplified below with reference to FIG. 10.

TABLE 2a

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 608 | Duplicate Terminator | [Routing ID2] | Sequence Number Removal = False |
| Routing ID2 (DESTINATION = BAP Address of IAB-node 609, PATH2) | BAP Address of IAB-node 608 | Duplicate Terminator | [Routing ID1] | Sequence Number Removal = False |

IAB-node 606 acts as a Duplicate Terminator removing duplicates for this branch of the IAB network. As other duplicates are simultaneously conveyed over other BH links, the SN should be kept in the single copy transmitted by terminator IAB-node 606, for terminator IAB-node 608 to be able to also detect the duplicates coming from the various BH links.

By reading Sequence Number Removal Boolean information as False, terminator IAB-node 606 knows that it has to let the SN in the outgoing BAP packet. Thus, it detects the multiple duplicates from among the incoming BAP packets, thanks to their identical SN. It then discards the duplicates to only keep one copy. The single copy is then transmitted to the next-hop IAB-node of PATH1, i.e. to IAB-node 608 over BH link 668.

Table 2b illustrates exemplary entries 700 configuring terminator IAB-node 608.

The network coding operation is driven by the "Network Coding Initiator" value signaling the initiator for the operation and the "Network Coding Terminator" value signaling the terminator for the operation.

When Duplicate Command IE 703 takes the "Network Coding Initiator" value for a given BAP Routing ID (of incoming packets), it indicates the concerned IAB-node has to act as the initiator for the network coding operation. It means the IAB-node will generate a set of combinations from incoming BAP packets of the given BAP Routing ID. Parameters for the combinations may be provided in IE 705. These generated combinations, also referred to as outgoing redundant BAP packets, will be transmitted over one or several egress BH links as defined in IE 704 listing the BAP Routing IDs for the transmission (in a similar way as for the Duplicate Initiator for instance).

TABLE 2b

| 501 BAP Routing ID | 502 Next Hop BAP Address | 703 Duplicate Command | 704 Duplicate BAP Routing ID | 705 Duplicate Parameters |
|---|---|---|---|---|
| Routing ID2 (DESTINATION = BAP Address of IAB-node 609, PATH1) | BAP Address of IAB-node 609 | Duplicate Terminator | [Routing ID3] | Sequence Number Removal = True |
| Routing ID2 (DESTINATION = BAP Address of IAB-node 609, PATH3) | BAP Address of IAB-node 609 | Duplicate Terminator | [Routing ID2] | Sequence Number Removal = True |

IAB-node 608 acts as a Duplicate Terminator removing received duplicates to forward only one copy thereof. By reading Sequence Number Removal Boolean information as True, terminator IAB-node 608 knows that it has to remove the SN in the copy forwarded. Thus, it detects the multiple Parameters 705 may include a Network Coding Scheme to be used. For instance, one scheme may be based on the combinations of several incoming BAP packets. Another scheme may be based on the segmentation of each incoming BAP packet into segments of equal size, and combination thereof. In one embodiment of the invention, one parameter associated with the scheme may identify the number of incoming BAP packets or the number of segments to be combined together in each combination.

Parameters 705 may include Network Coding Coefficients to be used to generate each linear combination of incoming BAP packets or segments. These coefficients may be, as a non-limitative example, eight bits each in the Galois Field 256.

Parameters 705 may include the Sequence Number Insertion Boolean information as described above. This is again to provide SNs in the SN field 307 of the outgoing redundant BAP packets. With the Network coding, the sequence number may be increased by one for each new outgoing redundant BAP packet: the BAP packets resulting from the network encoding of the same original BAP packet are thus tagged with successive sequence numbers.

For instance, the SN format may be a.n+t (coded over 2 bytes in field 307 for instance), where a is the number (integer) of combinations realized by the network coding (for instance 4 in the example below), n is an integer incremented at each new network coding occurrence (i.e. when processing a next BAP packet), and t belongs to {0, 1, 2, . . . , a−1}. Each of these values is assigned to one of the a outputs of the network encoder.

In embodiments, SN field 307 may comprise k bits ($a \leq 2^k$, for instance k=2 with a=4 outputs) for identifying the different combinations when there are a outgoing packets resulting from the Network encoding, and the remaining bits (e.g. 14 bits in a 2-byte field) to count the number of encoding rounds or iterations (i.e. the count is incremented each time new outgoing packets are generated). The count may be reset each time a new Network Coding Configuration is used. The count returns naturally to zero when reaching its maximum.

This SN format is also compatible with the duplication operation if it coexists in the IAB network. The k bits (e.g. 2 bits) may be set to the same value for the original and duplicated BAP packets. The count (remaining bits) is incremented for each new original BAP packet to duplicate.

Table 3 illustrates exemplary entries 700 for a network coding initiator.

TABLE 3

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 606 | Network Coding Initiator | [Routing ID1, Routing ID1, Routing ID2, Routing ID2] | Sequence Number Insertion = True Scheme = Segmentation Number of segments = 2 $NC\ Coeffs = \begin{pmatrix} 1 & 0 \\ \alpha_{1,1} & \alpha_{1,2} \\ 0 & 1 \\ \alpha_{2,1} & \alpha_{2,2} \end{pmatrix}$ |
| Routing ID2 (DESTINATION = BAP Address of IAB-node 609, PATH2) | BAP Address of IAB-node 605 | None | | |

This table configures IAB-node 604 as a Network Coding Initiator IAB-node with four linear combinations to produce from a segmentation of the received BAP packet and with a sequence number to be inserted.

PATH1 is the default path (with and without Network Coding) through IAB-nodes 606 and 608, and PATH2 is the second path (with Network Coding) through IAB-nodes 605, 607 and 608.

The linear combinations are performed on segments forming an incoming BAP packet (scheme=segmentation). The first and second linear combinations use coefficients (1, 0) and (α11, α12) and the resulting outgoing redundant BAP packets are transmitted by IAB-node 604 through BH link 646 towards IAB-node 606 (PATH1 corresponding to Routing ID1 specified in 704 for the two first outgoing packets), while the third and fourth linear combinations use coefficients (0, 1) and (α21, α22) and the resulting outgoing redundant BAP packets are transmitted by IAB-node 604 through BH link 645 towards IAB-node 605 (PATH2 corresponding to Routing ID2 specified in 704 for the two last outgoing packets, thanks to the second entry in the table).

Not all sets of four coefficients in GF 256 can be used. A plurality of ones and zeros must be excluded, as they would let the original data unchanged. Furthermore (α11×α12) shall not be equal to (α21×α22), otherwise the linear combinations would be identical.

With respect to the sequence numbering, outgoing BAP packet generated from the first linear combination may be tagged with SN=4n; outgoing BAP packet generated from the second linear combination may be tagged with SN=4n+1; outgoing BAP packet generated from the third linear combination may be tagged with SN=4n+2; and outgoing BAP packet generated from the fourth linear combination may be tagged with SN=4n+3; When Duplicate Command IE 703 takes the "Network Coding Terminator" value for a given BAP Routing ID 501 or 704 (of incoming packets), it indicates the concerned IAB-node has to act as the terminator for the network coding operation. It means the IAB-node will apply network decoding to the incoming encoded BAP packets with a Routing ID matching field 501 or 704 of the table.

The IAB-node identifies the received combinations thanks to their SN in field 307 (the presence of which is indicated by bit 302) and decode them to retrieve the original BAP packet (through segments) or packets. The decoding parameters are provided in parameters 705.

In one embodiment of the invention, the IAB-node then transmits the decoded BAP packets over a single egress BH link corresponding to next-hop BAP address 502 (if the node is an intermediate IAB-node) or transmits them to upper layers (if the node is a destination IAB-node). In one embodiment of the invention, this single egress BH link is the one identified by the PATH field of the BAP Routing ID 501, i.e. toward next-hop IAB-node 502.

As for the Network Coding Initiator, parameters 705 may include a Network Coding Scheme to be used (segmentation or packets), Network Coding Coefficients to be used to decode the redundant BAP packets, and optionally the number of redundant BAP packets necessary for the decoding (in a variant this number is deduced from the number of combinations provided by the Network Coding Coefficients).

With respect to the sequence numbering of the incoming BAP packets, those having SN=a.n+t, with t belonging to {0, 1, 2, . . . , α−1} and the same value n are considered as redundant of the same original BAP packet or packets. The same number of redundant BAP packets as the number of original inputs (packets or packet segments) is usually sufficient to correctly perform the network decoding and retrieve the original inputs. In the example below for instance, two redundant BAP packets are sufficient for the network decoding.

Table 4 illustrates exemplary entries 700 for a network coding terminator.

TABLE 4

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 609 | Network Coding Terminator | [Routing ID2] | Sequence Number Removal = True Scheme = Segmentation Number of segments = 2 $NC\ Coeffs = \begin{pmatrix} 1 & 0 \\ \alpha_{1,1} & \alpha_{1,2} \\ 0 & 1 \\ \alpha_{2,1} & \alpha_{2,2} \end{pmatrix}$ |
| Routing ID2 (DESTINATION = BAP Address of IAB-node 609, PATH2) | BAP Address of IAB-node 609 | Network Coding Terminator | [Routing ID1] | Sequence Number Removal = True Scheme = Segmentation Number of segments = 2 $NC\ Coeffs = \begin{pmatrix} 1 & 0 \\ \alpha_{1,1} & \alpha_{1,2} \\ 0 & 1 \\ \alpha_{2,1} & \alpha_{2,2} \end{pmatrix}$ |

This table configures IAB-node 608 as a Network Coding Terminator IAB-node where the network decoding can be performed as soon as two incoming redundant BAP packets (Number of segments=2) have been received with Routing ID1 or Routing ID2 (specified in 501 and 704) in the header.

Redundant BAP packets can be identified if they have a sequence number equals to 4n+t, t belonging to {0, 1, 2, 3}, with the same value n. The redundant BAP packets corresponding to the same original BAP packet are thus those tagged with sequence numbers separate by less than the number of combinations defined by the network decoding.

For instance with a network coding scheme having four linear combinations, the sequence number matching 4n (n being an integer) corresponds to the first linear combination of a set of redundant BAP packets, the sequence number matching (4n+1) corresponds to the second linear combination, the sequence number matching (4n+2) corresponds to the third linear combination, and the sequence number matching (4n+3) corresponds to the fourth linear combination. Besides, the number of generated combinations in the source IAB-node may be deduced from the number of rows in the matrix of coefficients in IE 705. Therefore, it is sufficient to retrieve two different incoming redundant BAP packets with SN comprised between 4n and 4n+3.

Of course, another number of combinations than 4 may be used.

The network decoding uses parameters 705 (Network Coding Scheme and Coefficients).

The outputs of the network decoding may be multiple segments of an original BAP packet, in which case the latter is reconstructed using a de-segmentation process. Alternatively, the outputs may directly be different original BAP packets.

The resulting BAP packet or packets are transmitted over the egress BH link 689 between IAB-nodes 608 and 609 (corresponding to the next-hop BAP address of IE 502). In one embodiment of the invention, the header of the decoded BAP packets may be updated to the initial value Routing ID1 or to a default Routing ID such as Routing ID1. Indeed, all the decoding BAP packets have to be sent over the same link.

This example clearly shows that, thanks to the invention, the redundancy introduced by network coding BAP packets is fully controlled between IAB-nodes 604 and 608, without impacting bandwidth usage of other links (such as BH links 614 and 689) with a higher number of packets.

One may note that the duplication operation is nothing more than the network coding operation based on an Identity matrix.

Sequence numbers may however be managed in a different way: with duplication, the same SN is provided in each duplicate while with network coding, successive SNs are provided to make it possible to identify which BAP packet corresponds to which combination.

It may happen that network coding is activated for some BAP packets and then nested duplication is activated on the network coded packets (i.e. between their coding and their decoding) in a similar fashion as the nested duplication envisioned above.

In that case, the Network Coding Initiator may be configured with a Sequence Number Insertion Boolean information set to True (thus successive SNs are provided to the outgoing redundant BAP packets), while the Duplicate Initiator may be configured with a Sequence Number Insertion Boolean information set to False (hence it only produces copies of the received BAP packets, keeping their SN). Correspondingly, the Duplicate Terminator may be configured with a Sequence Number Removal Boolean information set to False (i.e. the SN is let in the kept copy of the received duplicate BAP packets), while the Network Coding Terminator may be configured with a Sequence Number Removal Boolean information set to True to ultimately remove the SNs from the BAP packets.

Management of the SNs (insertion and removal) is exemplified below with reference to FIG. 10.

The split operation is driven by the "Split" value signaling the initiator for the duplication. No terminator is required.

When Duplicate Command IE 703 takes the "Split Initiator" value for a given BAP Routing ID (of incoming packets), it indicates the concerned IAB-node has to act as the initiator for the splitting operation. It means the IAB-node will split an incoming flow of BAP packets over two or more egress links.

This embodiment aims at load balancing the BH links: the bandwidth occupation is distributed among several paths while the processing load for transmission is spread over different IAB-nodes.

Only an initiator (and no terminator) is required for the splitting operation, because at the end all the packets arrive to the same destination IAB-node.

The splitting is driven by IE 704 and IE 705.

IE 704 indicates a list of Routing IDs to distribute the BAP packets. As shown in exemplary Table 5 below, the value [Routing ID1, Routing ID2] indicates the incoming BAP packets will be routed and transmitted on the corresponding egress links (specified in IE 502 for the entries corresponding to Routing ID1 and Routing ID2).

IE 705 provides parameters to perform the split. For instance, a Split Scheme field indicates the percentage of BAP packets to be transmitted for each Routing ID of IE 704 (i.e. each egress link), and a Split Threshold field indicates the percentage of bandwidth occupation of the default link to be reached to trigger the data split in the IAB-node. In some embodiments, different split schemes may be defined in IE 705 for different respective Split Thresholds (the split percentages evolves when the bandwidth occupancy evolves).

In the example below, if the bandwidth occupancy reaches 50%, 40% of the BAP packets of Routing ID1 are transmitted over the egress link of Routing ID1, i.e. BH link 646 to IAB-node 606 while 60% of the BAP packets of Routing ID1 are transmitted over the egress link of Routing ID2, i.e. BH link 645 to IAB-node 605. The latter BAP packets may have a BAP header updated to specify Routing ID2 instead of Routing ID1.

TABLE 5

| 501 BAP Routing ID | 502 Next Hop BAP Address | 703 Duplicate Command | 704 Duplicate BAP Routing ID | 705 Duplicate Parameters |
|---|---|---|---|---|
| Routing ID1 (DESTINATION = BAP Address of IAB-node 609, PATH1) | BAP Address of IAB-node 606 | Split Initiator | [Routing ID1, Routing ID2] | Split scheme = 40; 60 Split Threshold = 50 |
| Routing ID2 (DESTINATION = BAP Address of IAB-node 609, PATH2) | BAP Address of IAB-node 605 | None | | |

In some embodiments, IE 704 may be left empty. In such a case, the IAB-node may set the Routing ID information element of the outgoing duplicated/redundant/split BAP packets to the value of Routing IDs from other entries of the Backhaul Routing Configuration table that have the same DESTINATION value as the one in IE 501. The select egress BH link is obtained based on the Next-Hop BAP Address IE 502 of the entry having the Routing ID used.

Still with reference to FIG. 7, alternative entry 710 of the Backhaul Routing Configuration table differs from entry 700 by IE 714 (to be compared to IE 704).

IE 714, called Duplicate Next Hop BAP Address, provides a list of Next Hop BAP Addresses instead of a list of Routing IDs (as in IE 704). This makes it easier for the IAB-node to determine the egress BH links (because it is no longer necessary to search the entries corresponding to the Routing IDs of the list).

In this case, the Routing ID of all the outgoing duplicated/redundant/split BAP packets is equal to the Routing ID of the incoming BAP packets. In other words, the Routing ID is not modified When IE 703 is set to Duplication Initiator, IE 714 identifies a list of egress BH links to transmit the outgoing duplicates. When IE 703 is set to Duplication Termination, IE 714 is not used. The duplication removal is performed on the incoming duplicates with Routing ID matching IE 501 of this entry.

When IE 703 is set to Network Coding Initiator, IE 714 represents a list of combinations with the corresponding egress BH links. For instance, [Next Hop BAP Address 1, Next Hop BAP Address 1, Next Hop BAP Address 2, Next Hop BAP Address 2] means the first and second combinations are transmitted over the egress link associated with Next Hop BAP Address 1, while the third and fourth combinations are transmitted over the egress link associated with Next Hop BAP Address 2. When IE 703 is set to Network Coding Terminator, IE 714 is not used. The decoding is performed on the incoming redundant BAP packets with Routing ID matching IE 501 of this entry. The number of incoming redundant BAP packets to be received to trigger the decoding is indicated by the depth of the matrix of coefficients available in IE 705.

When IE 703 is set to Split Initiator, IE 714 represents a list of egress BH links to distribute the outgoing BAP packets (split subflows).

The augmented Backhaul Routing Configuration table described above makes it possible for an initiator IAB-node to determine the egress BH links to be used to transmit outgoing BAP packets, according to embodiments of the invention.

The conventional BH RLC channel mapping configuration table, Uplink Traffic to BH RLC Channel Mapping Configuration table and Downlink Traffic to BH RLC Channel Mapping Configuration table (described above) can be used to derive the egress BH RLC channels from the selected egress BH links. Therefore, each subflow of duplicated/redundant/split BAP packets is directed (and transmitted) at an initiator to an egress BH RLC channel. Also the outgoing original BAP packets at a terminator are directed (and transmitted) to a specific egress BH RLC channel.

In some embodiments, augmented BH RLC channel mapping configuration table, augmented Uplink Traffic to BH RLC Channel Mapping Configuration table and augmented Downlink Traffic to BH RLC Channel Mapping Configuration table are used for the IAB-node to derive multiple egress BH RLC channels from a single selected egress BH link.

This approach aims at providing BH RLC channel diversity, hence improving transmission robustness.

FIG. 8 illustrates exemplary entries for an augmented BH RLC channel mapping configuration table 810, an augmented Uplink Traffic to BH RLC Channel Mapping Configuration table 820 and an augmented Downlink Traffic to BH RLC Channel Mapping Configuration table 830 providing such BH RLC diversity.

IEs 814, 823, 835 replace IEs 514, 523, 534 respectively.

Instead of defining a single egress BH RLC channel ID, they include a list of egress BH RLC channel IDs. When transmitting the outgoing BAP packets, the IAB-node may then alternatively (or using any selection scheme) select one of the egress BH RLC channel IDs for transmission. In embodiments, the BH RLC channel ID is selected in a round robin fashion among the possible values indicated in IE 814, 823 or 835.

For instance, if there are two possible BH RLC channels, the first (more generally odd) outgoing BAP packet can be transmitted via the first BH RLC channel while the second (more generally even) outgoing BAP packet can be transmitted via the second BH RLC channel.

In some embodiments, a control on the BH RLC channel diversity mechanism is provided in order that not all the BAP packets matching a table entry 810, 820 or 830 are transmitted over multiple BH RLC channels.

A control based on the Routing ID may be implemented. For instance, an additional IE 819, 829 or 839, referred to as BAP Routing ID, is provided in the table entry 810, 820 or 830 respectively. IE 819, 829 or 839 includes one or more triggering BAP Routing IDs, i.e. BAP Routing IDs for which the BH RLC channel diversity mechanism is applied: only the outgoing BAP packets of these BAP Routing IDs are spread over the multiple BH RLC channels of IE 814, 823 or 835. For the other BAP Routing ID, a default BH RLC channel ID may be used, for instance the ID first declared in IE 814, 823 or 835: the outgoing BAP packets having a BAP Routing ID not listed in IE 819, 829 or 839 are transmitted only over the default BH RLC channel.

As mentioned above, although the various tables described below may be manually defined in the various IAB-nodes of the network, they are preferably defined by the IAB-donor CU and then transmitted to the various IAB-nodes (including IAB-donor DU) during configuration of their BAP routing.

Figure 9:
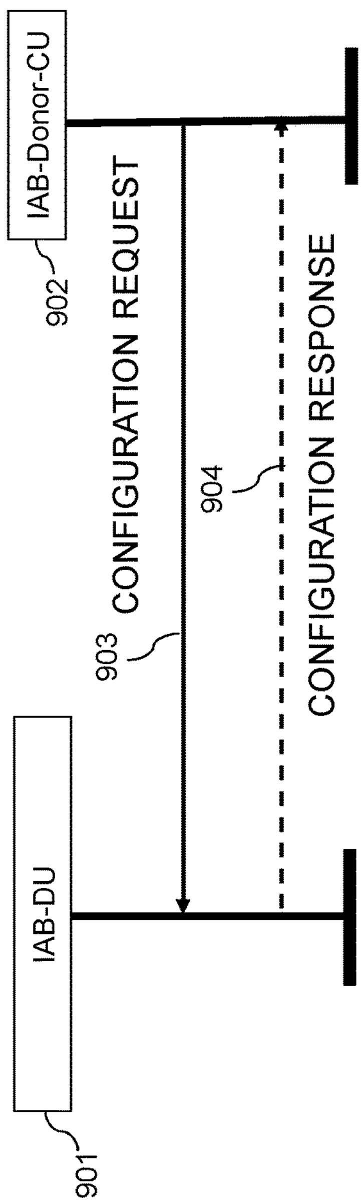
FIG. 9 illustrates, using a flowchart, an exemplary method for configuring the BAP routing at an IAB-node (including IAB-donor DU) by the IAB-donor CU, according to embodiments of the invention.

FIG. 9 illustrates, using a flowchart, an exemplary method for configuring the BAP routing at an IAB-node (including IAB-donor DU) by the IAB-donor CU.

The BAP routing configuration Procedure is initiated by the IAB-donor CU 902 in order to configure the DL/UL (Downlink/Uplink) routing information and/or traffic mapping information needed by the IAB-donor DU or the IAB-node DU, both referred below to as IAB-DU 901.

The IAB-donor-CU 902 initiates the procedure by sending a CONFIGURATION REQUEST message 903 to an IAB-DU 901 to configure with the above tables. The IAB-DU 901 replies to the IAB-donor CU 902 with a CONFIGURATION RESPONSE message 904.

In one embodiment of the invention, the CONFIGURATION REQUEST message 903 carries the information required to configure the augmented Backhaul Routing Configuration table of the IAB-DU 901, i.e. the IEs shown in FIG. 7. The message may include the whole table. Alternatively, the message may only include whole entries 700, 710 that are to be updated or added. Still alternatively, the message may only include information for updating entries already stored in the IAB-DU 901 and/or for adding new entries.

In one embodiment of the invention, the CONFIGURATION REQUEST message 903 carries the information required to configure the (Uplink Traffic to/Downlink Traffic to) BH RLC channel mapping configuration tables of the IAB-DU 901, i.e. the IEs shown in FIGS. 5*b-c* or in FIG. 8. The message may include a whole table. Alternatively, the message may only include whole entries 810, 820 or 830 that are to be updated or added. Still alternatively, the message may only include information for updating entries already stored in the IAB-DU 901 and/or for adding new entries.

Various message types may be used for the CONFIGURATION REQUEST and RESPONSE messages.

In one embodiment, the CONFIGURATION REQUEST message 903 is a BAP MAPPING CONFIGURATION message and the CONFIGURATION RESPONSE message 904 is a BAP MAPPING CONFIGURATION ACKNOWLEDGE message, as described in 3GPP TS 38.473 v16.2.0, sections 9.2.9.1 and 9.2.9.2.

The additional fields (i.e. IEs 703-705 or 713-715) of the augmented Backhaul Routing Configuration table may be declared as optional IEs in the BH Routing Information Added List IE of the BAP MAPPING CONFIGURATION message as described in 3GPP TS 38.473 v16.2.0. The corresponding declaration may be as in Table 6.

TABLE 6

| IE/Group Name | Presence | Range | IE type and reference |
|---|---|---|---|
| Message Type | M | | 9.3.1.1 |
| Transaction ID | M | | 9.3.1.23 |
| BH Routing Information Added List | | 0 . . . 1 | |
| >BH Routing Information Added List Item | | 1 . . . <maxnoofRoutingEntries> | |
| >>BAP Routing ID 501 | M | | 9.3.1.110 |
| >>Next-Hop BAP Address 502 | M | | 9.3.1.111 |
| >>Duplicate Command 703/713 | O | | |
| >>Duplicate BAP Routing ID 704 | O | | |
| >>Duplicate Next Hop BAP Address 714 | O | | |
| >>Duplicate Parameters 705/715 | O | | |
| BH Routing Information Removed List | | 0 . . . 1 | |
| >BH Routing Information Removed List Item | | 1 . . . <maxnoofRoutingEntries> | |
| >>BAP Routing ID | M | | 9.3.1.110 |
| Traffic Mapping Information | O | | 9.3.1.95 |

In a variant, the CONFIGURATION REQUEST message 903 is a UE CONTEXT SETUP REQUEST message and the CONFIGURATION RESPONSE message 904 is a UE CONTEXT SETUP RESPONSE message, as described in 3GPP TS 38.473 v16.2.0, sections 9.2.2.21 and 9.2.2.2.

In another variant, the CONFIGURATION REQUEST message 903 is a UE CONTEXT MODIFICATION REQUEST message and the CONFIGURATION RESPONSE message 904 is a UE CONTEXT MODIFICATION RESPONSE message, as described in 3GPP TS 38.473 v16.2.0, sections 9.2.2.7 and 9.2.2.8.

As far as the augmented (Uplink Traffic to/Downlink Traffic to) BH RLC channel mapping configuration tables are considered, IE 814, 823 or 835 may be declared as Egress BH RLC CH ID IEs as described in 3GPP TS 38.473 v16.2.0 but modified to carry a list of BH RLC Channel ID IEs (as described in section 9.3.1.113 of 3GPP TS 38.473 v16.2.0).

In a variant, IE 814, 823 or 835 is declared using a new Egress BH RLC CH ID List IE which carries a list of BH RLC Channel ID IEs (as described in section 9.3.1.113).

In another variant, IE 814, 823 or 835 is declared using Traffic Mapping Information IE (as described in section 9.3.1.95 of 3GPP TS 38.473 v16.2.0). Advantageously, the Traffic Mapping Information IE is embedded in the BAP MAPPING CONFIGURATION message or the UE CONTEXT MODIFICATION REQUEST message or the UE CONTEXT MODIFICATION REQUEST message, as described in 3GPP TS 38.473 v16.2.0.

In some embodiments, all or part of the IEs shown in FIG. 8 are part of the BH Routing Information Added List IE embedded in the BAP MAPPING CONFIGURATION message, as described in 3GPP TS 38.473 v16.2.0.

In some embodiments, all of part of the IEs configuring the Uplink Traffic to BH RLC channel mapping configuration table (i.e. IEs of entry 820) are conveyed in a GNB-CU CONFIGURATION UPDATE message or a F1 SETUP RESPONSE message as defined in 3GPP TS 38.473 v16.2.0.

With the above augmented Backhaul Routing Configuration table, the Duplication Command 703 is associated with a Routing ID, meaning that all the data flows associated with this Routing ID will be processed according to the Duplication Command.

However, it may be useful that some data flows are indeed processed with a BAP-sublayer operation while other data flows should not. In this respect, it is proposed to offer the access IAB-node and the IAB-donor DU the ability to select an appropriate Routing ID should they prefer applying the operation on the data flow or not. When configuring the Downlink Traffic to Routing ID Mapping Configuration table for an IAB-node transmitting in downlink direction and the Uplink Traffic to Routing ID Mapping Configuration table for an IAB-node transmitting in uplink direction, the IAB Donor CU may assign to some data flows a Routing ID for which the Duplication Command 703 will always be None, while it may assign to other data flows a different Routing ID on which Duplication, Network Coding, or Split processing may be applied later on. However, the default path to reach the destination IAB-node may be the same for all these data flows. Such configuration thus offers the flexibility to not systematically apply Duplication, Network Coding, or Split to all the data flows transmitted over the same path.

In a variant, a control on when the BAP-sublayer operation is applied or not may be dynamically driven by the IAB-donor CU. The latter may thus send a BAP-sublayer operation activation/deactivation command (a protocol message) to an IAB-node to activate or deactivate the BAP-sublayer operation for BAP packets to be received. As a consequence, the initiator and terminator IAB-nodes control to perform or not the BAP-sublayer operation based on the BAP-sublayer operation activation/deactivation command received from the IAB-donor CU. Furthermore, the initiator or the terminator may be already performing the BAP-sublayer operation (duplication, network coding, split) when subsequently receiving, from the IAB-donor CU, a BAP-sublayer operation activation/deactivation command deactivating the BAP-sublayer operation. It means for the initiator that BAP packets subsequently received with the same BAP Routing ID are not transmitted over multiple RLC channels; they are not duplicated or network coded or split. For the terminator, redundant BAP packets subsequently received are not processed to obtain a single original BAP packet; they are not reverse duplicated or network decoded, but are all transmitted to a next-hop IAB-node.

Preferably, the BAP-sublayer operation activation/deactivation command is provided in association with a BAP Routing ID (or more) identifying received BAP packets. This is to finely control the duplication/network coding/split of some packet flows, while other flows are not processed.

The BAP-sublayer operation activation/deactivation command may be implemented using a dedicated information element (IE), for instance named Operation Activation IE. It may comprise a Boolean which when it takes the value True declares activation of the BAP-sublayer operation (the IAB-node, be initiator or terminator, thus shall apply the operation) and when it takes the value False declares deactivation of the BAP-sublayer operation (the IAB-node thus shall stop applying the operation).

One or more conditions may be associated with the BAP-sublayer operation. The condition or conditions have to be met for respectively activating or deactivating the BAP-sublayer operation. The condition or conditions are for instance declared using a dedicated information element (IE), for instance called Operation Condition IE, which is provided in the same message as the command or in a separate message.

Without condition being declared, the BAP-sublayer operation is immediately applied (respectively stopped) by an addressee IAB-node (initiator or terminator) responsive to receiving a command activating (resp. deactivating) the operation.

Various conditions to trigger the activation or deactivation of the BAP-sublayer operation can be contemplated, alone or in combination.

A first exemplary condition relates to timing information. It defines when the BAP-sublayer operation is activated or deactivated. For instance, a start time may define when an initiator or terminator starts applying the BAP-sublayer operation, for instance for a given BAP Routing ID. Similarly, an end time defines when stopping the applying of the operation. A dedicated IE, namely Activation Timing IE, may be provided in Operation Condition IE.

A second exemplary condition relates to radio frame identifier. It defines from which one of the radio frames including BAP packets, the BAP-sublayer operation is activated or deactivated. For instance, a first radio frame #N may define the first radio frame for which an initiator or terminator starts applying the BAP-sublayer operation on BAP packets contained in the frames, for instance for a given BAP Routing ID. Similarly, a second radio frame #M may define the last radio frame from which an initiator or terminator stops applying the BAP-sublayer operation on BAP packets contained in the frames. A dedicated IE, namely Frame Identifier IE, may be provided in Operation Condition IE.

A third exemplary condition relates to BAP packet identifier. It defines from which received BAP packet, the BAP-sublayer operation is activated or deactivated. It may for instance rely on the sequence number used above. As an example, an initiator or terminator starts actually applying the BAP-sublayer operation on the BAP packets when the value of the SN of one received BAP packet, which SN has been added previously by the IAB-donor-CU, equals a predefined initiate SN. In a variant, the initiator or terminator actually applies the BAP-sublayer operation to each BAP packet whose SN is within a specific range. Similarly, an initiator or terminator stops applying the BAP-sublayer operation on the BAP packets for a given BAP Routing ID when the value of the SN of one received BAP packet, which SN has been added previously by the IAB-donor-CU, equals a terminate SN. In the variant, the initiator or terminator actually does not apply the BAP-sublayer operation to each BAP packet whose SN is outside the range or in variant within another specific range. A dedicated IE, namely Packet Identifier IE, may be provided in Operation Condition IE.

A fourth exemplary condition relates to BH link quality threshold. It defines from which link quality of an egress link the BAP-sublayer operation is activated or deactivated. In particular, the egress link concerned is the one corresponding to the BAP Routing ID associated with the BAP-sublayer operation activation/deactivation command. For instance, if the egress BH link normally used (according to table 500) by an initiator to forward the incoming packets experiences low quality (below the threshold), the initiator starts applying the BAP-sublayer operation on the received BAP packets. Similarly, if the egress BH link normally used (according to table 500) by a terminator to forward the incoming packets experiences low quality (below the threshold), the terminator may not apply the BAP-sublayer operation, in order to let the BAP packets be duplicated for instance. Conversely, when the egress BH link normally used by the initiator experiences better quality (above the threshold), the initiator may stop applying the BAP-sublayer operation.

Thanks to these various conditions, the IAB-donor CU may trigger the duplications (or network coding or split) in various subparts of the IAB network at different times.

In addition, it can make the IAB network smarter. For instance, nodes 601 and 604 may be declared as potential initiators for a duplication operation, with different conditions. For instance, at different day times (estimated based on network occupancy for instance), the duplication may be made by IAB-donor 601 or IAB-node 604, so that some of the BAP packets transit via BH links 612 and 626, or not. Of course, another of the above conditions can be used to drive such smart control on activating the BAP-sublayer operation at IAB-node level.

The Operation Activation IE (i.e. the BAP-sublayer operation activation/deactivation command) and/or the Operation Condition IE may be provided to the addressee IAB-node in a CONFIGURATION REQUEST message 903 as described above. Message 903 may include the tables mentioned above or parts thereof or not.

In some embodiments, the CONFIGURATION REQUEST message 903 is a BAP MAPPING CONFIGURATION message, a UE CONTEXT SETUP REQUEST message or an UE CONTEXT MODIFICATION REQUEST message, as defined in 3GPP TS 38.473 v16.2.0.

Figure 9A:
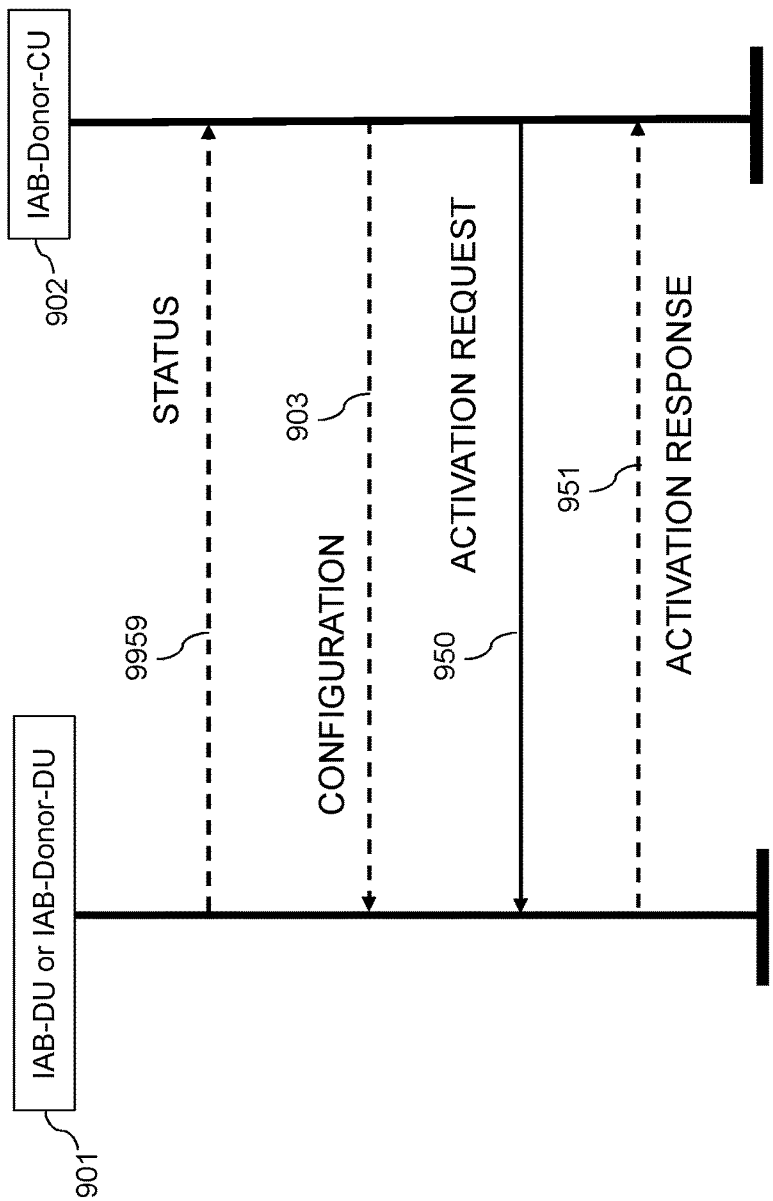
FIG. 9*a* illustrates, using a flowchart, an exemplary method for activating or deactivating a BAP-sublayer operation according to embodiments of the invention.

As shown in FIG. 9*a*, the Operation Activation IE (i.e. the BAP-sublayer operation activation/deactivation command) and/or the Operation Condition IE may be provided to the addressee IAB-DU 901 in an ACTIVATION REQUEST message 950. This message may be additional (or not) to the CONFIGURATION REQUEST 903 which, in this case, does not comprise the Operation Activation IE and the Operation Condition IE. The addressee IAB-DU 901 responds with one or more ACTIVATION RESPONSE messages 951 to acknowledge safe configuration.

The ACTIVATION REQUEST message 950 may be an F1-AP message in relation with 3GPP TS 38.473.

In one embodiment, the ACTIVATION REQUEST message 950 is a BAP MAPPING CONFIGURATION message and the ACTIVATION RESPONSE message 951 is a BAP MAPPING CONFIGURATION ACKNOWLEDGE message, as described in 3GPP TS 38.473 v16.2.0, sections 9.2.9.1 and 9.2.9.2.

The Operation Activation IE and the Operation Condition IE may be declared as optional IEs in the BH Routing Information Added List IE of the BAP MAPPING CONFIGURATION message as described in 3GPP TS 38.473 v16.2.0. The corresponding declaration may be as in Table 6a.

TABLE 6a

| IE/Group Name | Presence | Range | IE type and reference |
|---|---|---|---|
| Message Type | M | | 9.3.1.1 |
| Transaction ID | M | | 9.3.1.23 |
| BH Routing Information Added List | | 0 . . . 1 | |
| >BH Routing Information Added List Item | | 1 . . . <maxnoofRoutingEntries> | |
| >>BAP Routing ID | M | | 9.3.1.110 |

TABLE 6a-continued

| IE/Group Name | Presence | Range | IE type and reference |
|---|---|---|---|
| >>Next-Hop BAP Address | M | | 9.3.1.111 |
| >>Operation Activation | O | | |
| >>Operation Condition | O | | |
| BH Routing Information Removed List | | 0 . . . 1 | |
| >BH Routing Information Removed List Item | | 1 . . . <maxnoofRoutingEntries> | |
| >>BAP Routing ID | M | | 9.3.1.110 |
| Traffic Mapping Information | O | | 9.3.1.95 |

Of course, the additional fields presented in relation to Table 6 may supplement those additional fields presented in relation to Table 6a.

In a variant, the ACTIVATION REQUEST message 950 is a UE CONTEXT SETUP REQUEST message and the ACTIVATION RESPONSE message 951 is a UE CONTEXT SETUP RESPONSE message, as described in 3GPP TS 38.473 v16.2.0, sections 9.2.2.21 and 9.2.2.2.

In another variant, the ACTIVATION REQUEST message 950 is a UE CONTEXT MODIFICATION REQUEST message and the ACTIVATION RESPONSE message 951 is a UE CONTEXT MODIFICATION RESPONSE message, as described in 3GPP TS 38.473 v16.2.0, sections 9.2.2.7 and 9.2.2.8.

In yet another variant, the ACTIVATION REQUEST message 950 is an RRC message, as defined in 3GPP TS 38.331.

Still as shown in the Figure, the CONFIGURATION REQUEST message 903 or the ACTIVATION REQUEST message 950 is responsive to a STATUS message 959 previously sent by the addressee IAB-DU 901.

The STATUS message 959 may report a BH link quality level. For instance, a SINR (signal-to-interference-noise ratio) level is indicated, corresponding to all or part of both the ingress and egress BH links for this addressee IAB-DU 901. The SINR level may be the lowest SINR level of all the BH links considered.

In a variant, the STATUS message 959 includes an explicit request of the addressee IAB-DU 901 for BAP-sublayer operation activation or deactivation. A dedicated Operation Activation Request IE may be used to that end.

For instance, the STATUS message 959 is an UL RRC MESSAGE TRANSFER message, as defined in 3GPP TS 38.401, section 8.2.4. The UL RRC MESSAGE TRANSFER message may include a MeasurementReport message storing the measured SINR level.

The IAB-donor CU 902 may consequently decide to command the activation or deactivation of the BAP-sublayer operation at the addressee IAB-DU 901, based on the received STATUS message 959.

Should the decision be to activate a BAP-sublayer operation requiring multiple BH egress links at the addressee IAB-DU 901 while the latter only has a single BH egress link, the IAB-donor CU 902, responsive to receiving the STATUS message 959 and prior to sending the ACTIVATION REQUEST message 950, may realize an Intra-CU topological redundancy procedure, as defined in section 8.2.4 of the 3GPP TS 38.401, in order to establish redundant paths in the egress IAB topology from the addressee IAB-DU 901. In particular, the IAB-donor CU can establish at least one redundant egress path at the addressee IAB-node before activating, at the same IAB-node, a BAP-sublayer operation requiring two (or more) egress paths from the IAB-node.

The above examples activate or deactivate the BAP-sublayer operations at IAB-node level through dedicated messages sent by the IAB-donor CU.

In alternative embodiments, the BAP-sublayer operation activation/deactivation command is directly included in one of the received BAP packets to process according to the operation. This advantageously directly links the command to a given BAP Routing ID (defined in the header of the BAP packet). Furthermore, the IAB-donor CU may then notify an IAB-DU to activate or deactivate the operation without the need for sending an ACTIVATION REQUEST message 950 or equivalent thereof.

FIG. 3 shows the format of a BAP packet or PDU as explained above.

In some embodiments, bit 302 is used to convey the BAP-sublayer operation activation/deactivation command: bit set to True or 1 for activating the BAP-sublayer operation, bit set to False or 0 for deactivating it. Of course, another bit may be used to the same purpose. Any IAB-node in which the BAP packet with bit 302 set to 1 transits may use its BAP routing configuration described above to know whether it has to apply a BAP-sublayer operation 703 (duplication, network coding, split) for the BAP packet (and its corresponding Routing ID 305+306) and in the affirmative, with which parameters 705.

In other embodiments, bit 302 is used to signal whether the IAB-node in which the BAP packet transits has to parse field 307. As shown in FIG. 3*a*, field 307 may include the BAP routing configuration defining the BAP-sublayer operation to perform in case the BAP-sublayer operation is activated. However, this is not mandatory. Field 307 may be part of the BAP header.

Bit 302 may correspond to the BAP-sublayer operation activation/deactivation command as described above: bit set to True or 1 for activating the BAP-sublayer operation, bit set to False or 0 for deactivating it. In that case, field 307 only comprises fields 371 to 378 in particular to define the BAP routing configuration to use for applying the BAP-sublayer operation. Advantageously, field 307 may be provided in some successive BAP packets having bit 302 set to True for the various IAB-nodes to know (from field 307) their role. Following BAP packets may only have bit 302 set to True without field 307. These BAP packets are also to be treated through the BAP-sublayer operation. At the end, one (or more) BAP packets are sent with bit 302 set to False, ending the BAP-sublayer operation. All these BAP packets have the same Routing ID 305+306.

In a variant, bit 302 may only indicate whether a field 307 is provided (bit set to True or 1) or not (bit set to False or 0). In that case field 307 comprises fields 370 to 378 wherein field 370 is a single bit encoding the BAP-sublayer operation activation/deactivation command: bit set to True or 1 for activating the BAP-sublayer operation, bit set to False or 0 for deactivating it.

When bit 370 is set to False, fields 371 to 378 are optional. When bit 370 is set to True, all or part of fields 371 to 378 may become mandatory as described below.

Field 371 provides the byte length of field 307.

Fields 372-376 provide the BAP routing configuration for the concerned BAP-sublayer operation. Advantageously, it defines the BAP routing configuration for both the initiator and terminator.

Field 372 indicates the BAP-sublayer operation, i.e. either duplication or network coding or split. This is similar to field 703 described above without the distinction between initiator and terminator.

Field 373 indicates the BAP address of the initiator IAB-node for the defined BAP-sublayer operation. This may be IAB-node 604 for instance.

Field 374 indicates the BAP address of the terminator IAB-node for the defined BAP-sublayer operation. This may be IAB-node 608 for instance.

Advantageously, when the BAP packet transits through an IAB-node, the latter can determine, using fields 373 and 374, which role it has to play (either initiator or terminator or none).

Field 375 includes the parameters for the BAP-sublayer operation. It may be similar to IE 705 described above.

Field 376 indicates a list of one or more next-hop BAP addresses identifying the egress BH links to transmit the BAP packets resulting from the BAP-sublayer operation defined in field 372. It may be similar to IE 714 for the initiators. Optionally, it is similar to IE 704 in which case the conventional Backhaul Routing Configuration table has to be used to know the next-hop BAP addresses, hence the egress BH links.

Optional field 377 provides one or more conditions for activating/deactivating the BAP-sublayer operation, for instance SINR level of BH links. For example, it includes the Operation Condition IE defined above.

Field 378 includes the sequence number as provided in the above embodiments: it is generally filled in by the initiators and removed by the terminators. It is further used by the terminators to identify redundant packets that are to be processed (based on the BAP-sublayer operation) to retrieve an original BAP packet.

Field 307 replaces the additional fields 703-705/713-715 of the augmented Backhaul Routing Configuration table in embodiments described above. In that case, the next-hop BAP addresses are obtained from field 376 (possibly using conventional Backhaul Routing Configuration table). The egress BH RLC channels can then be determined, from the known egress BH links, using the conventional BH RLC channel mapping configuration, Uplink Traffic to BH RLC Channel Mapping Configuration or Downlink Traffic to BH RLC Channel Mapping Configuration table (FIGS. 5*b* to 5*d*) or the corresponding augmented tables (FIG. 8). Turning now to FIG. 10, an exemplary method 1000 for managing the SNs of the BAP packets at BAP sublayer of an IAB-node is shown. This method supports the conditional insertion of a sequence number in the header of BAP packets, for the case of nested packet duplication at IAB sublayer level for instance.

After initialization of the method at step 1001, the IAB-node waits for the arrival of a BAP packet to process at step 1002.

When an incoming BAP packet is received, the IAB-node reads the augmented Backhaul Routing Configuration table (alternatively field 307 above) at step 1003 to determine at step 1004 which process shall be applied to the incoming BAP packet. In particular, it reads IE 703 or 713 (alternatively field 372 in conjunction with field 373 or 374) from the entry having IE 501 matching the BAP Routing ID of the incoming BAP packet.

If a redundancy operation (e.g. Duplication or Network Coding) is to be applied, the incoming BAP packet is transmitted at step 1005 to the appropriate processing engine (e.g. network encoder or decoder, or duplicator or inverse-duplicator) along with the parameters 705 (alternatively field 375) read from the table (e.g. the Network Coding coefficients). Next step 1006 consists in waiting for the end of the processing of the incoming BAP packet. If the process cannot end (e.g. packets are missing for the network decoding to be performed), the method loops back to step 1002 to process a new incoming BAP packet.

The process can thus end when all the required BAP packets have been received and processed. In the case of reverse duplication, the first received duplicate may be process to produce the original BAP packet to be forwarded and its SN is stored. The other duplicate with the same SN that are received later on will be discarded upon reception.

When the process is completed, the IAB-node gets the resulting BAP packet (or packets) at step 1007. There may be several resulting BAP packets in case of Duplication Initiator, Network Coding Initiator or Network Coding Terminator.

After step 1007 or when no redundant operation is to be performed (step 1004), the IAB-node checks whether the BAP packet(s) (incoming or resulting from processing) is arrived at destination.

This is the case when the DESTINATION field in its header correspond to the BAP address of the IAB-node. If the test is positive, the header is removed and the data section of each BAP packet is sent to the upper layers at step 1015.

If the test 1008 is negative, it means that the BAP packet(s) shall be transmitted over one or several egress links and BH RLC channels as determined above (thanks to IE 704 or field 376 and the (Uplink/Downlink to) BH RLC Channel Mapping Configuration table).

At step 1009, the IAB node determine the Routing ID to be set in the header of each outgoing BAP packet according to the information contained in the Backhaul Routing Configuration table (IE 704). If necessary, the header is updated with the new Routing ID to be used.

Next, at step 1010, the IAB-node checks whether a sequence number shall be inserted in the header of the outgoing BAP packet(s). This consists in checking whether the Sequence Number Insertion Boolean information in parameters 705 or 375 is set to True (for an Initiator only). In the affirmative, the SN insertion is performed at step 1011 as described above.

Otherwise, it is checked at step 1012 whether a sequence number shall be removed from the header. This consists in checking whether the Sequence Number Removal Boolean information in parameters 705 or 375 is set to True (for a Terminator only). In the affirmative, the removal is performed at step 1013 as described above.

Should the Sequence Number Insertion/Removal Boolean information be set to False, the two tests 1010 and 1012 are negative, hence avoiding any modification of the SNs.

Finally at step 1014, the egress link is selected for each outgoing BAP packet based the Backhaul Routing Configuration table (IE 502 of the entry matching the BAP Routing ID of the packet). Also, the BH RLC channel is selected for each outgoing BAP packet using the (Uplink/Downlink to) BH RLC Channel Mapping Configuration table, conventional or augmented. Then, the outgoing BAP packet is transmitted to lower layers for transmission to the next-hop BAP node. Next, the IAB-node loops back to step 1002.

Figure 11:
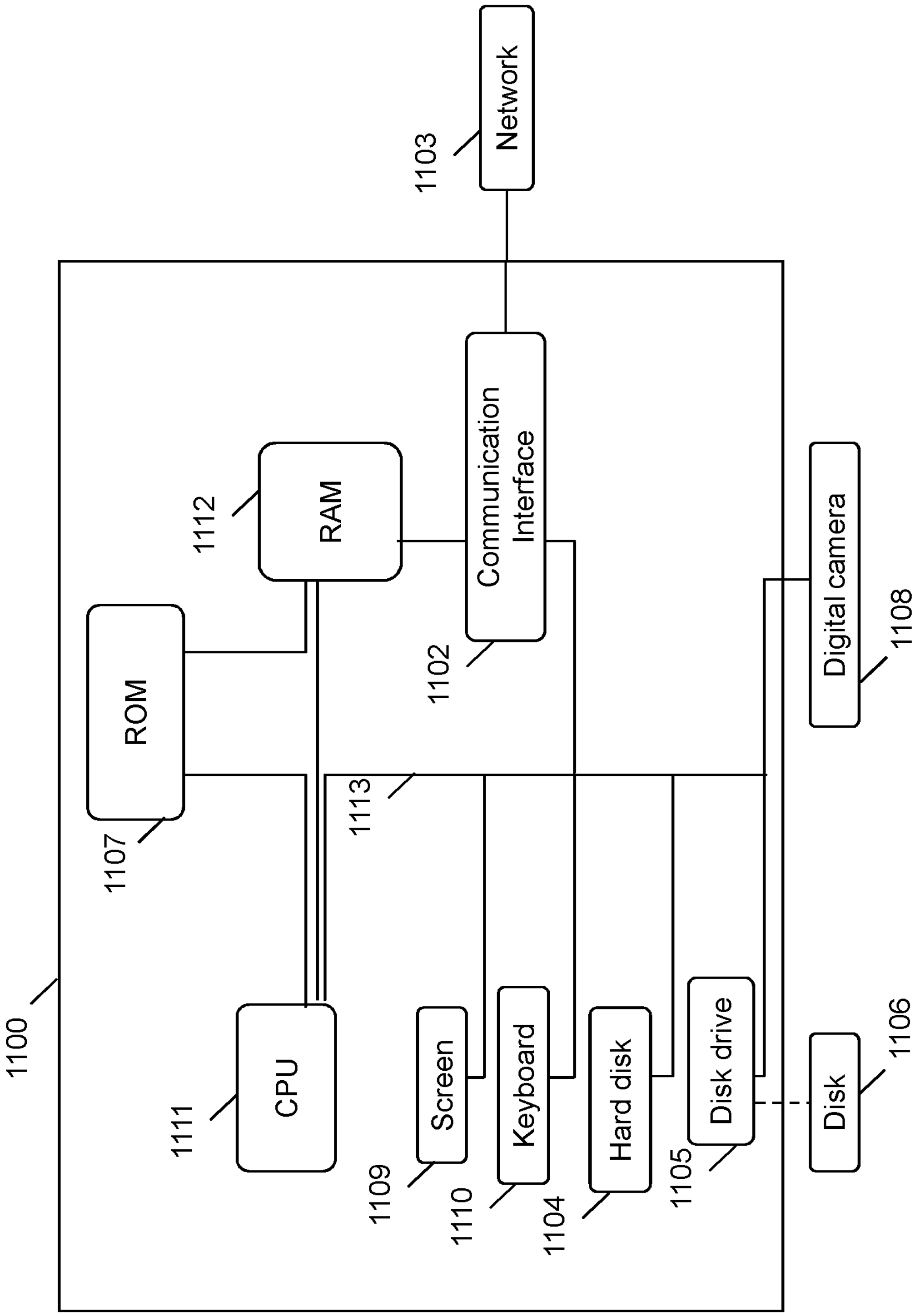
FIG. 11 shows a schematic representation of a wireless communication device in accordance with embodiments of the present invention.

FIG. 11 shows a schematic representation a communication device or station, in accordance with one or more example embodiments of the present disclosure.

The communication device 1100 may preferably be a device such as a micro-computer, a workstation or a light portable device. The communication device 1100 comprises a communication bus 1113 to which there are preferably connected:

- a central processing unit 1111, such as a microprocessor, denoted CPU;
- a read only memory 1107, denoted ROM, for storing computer programs for implementing the invention;
- a random-access memory 1112, denoted RAM, for storing the executable code of methods according to embodiments of the invention as well as the registers adapted to record variables and parameters necessary for implementing methods according to embodiments of the invention; and
- at least one communication interface 1102 connected to the radio communication network 100 over which digital data packets or frames or control frames are transmitted, for example a wireless communication network according to the release 16 for 5G NR. The frames are written from a FIFO sending memory in RAM 1112 to the network interface for transmission or are read from the network interface for reception and writing into a FIFO receiving memory in RAM 1112 under the control of a software application running in the CPU 1111.

Optionally, the communication device 1100 may also include the following components:

- a data storage means 1104 such as a hard disk, for storing computer programs for implementing methods according to one or more embodiments of the invention;
- a disk drive 1105 for a disk 1106, the disk drive being adapted to read data from the disk 1106 or to write data onto said disk;
- a screen 1109 for displaying decoded data and/or serving as a graphical interface with the user, by means of a keyboard 1110 or any other pointing means.

Preferably the communication bus provides communication and interoperability between the various elements included in the communication device 1100 or connected to it. The representation of the bus is not limiting and in particular, the central processing unit is operable to communicate instructions to any element of the communication device 1100 directly or by means of another element of the communication device 1100.

The disk 1106 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 1107, on the hard disk 1104 or on a removable digital medium such as for example a disk 1106 as described previously. According to an optional variant, the executable code of the programs can be received by means of the communication network 1103, via the interface 1102, in order to be stored in one of the storage means of the communication device 1100, such as the hard disk 1104, before being executed.

The central processing unit 1111 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 1104 or in the read only memory 1107, are transferred into the random-access memory 1112, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network comprising an Integrated Access and Backhaul, IAB, network, the method comprising at an IAB-node:

- receiving Backhaul Adaptation Protocol, BAP, packets wearing the same BAP routing identifier,
- using a BAP routing configuration to perform a BAP-sublayer operation determining, for the same BAP routing identifier, multiple Radio Link Control, RLC, channels for the received BAP packets, that belong to one or more egress links, and
- transmitting the BAP packets over the multiple RLC channels, wherein transmitting the BAP packets includes obtaining BAP packets redundant to a received BAP packet, the redundant BAP packets including the received BAP packet and one or more duplicates thereof, adding the same sequence number to the received BAP packet and the duplicates thereof, and sending the redundant BAP packets over the multiple RLC channels.

2. The method of claim 1, wherein when the received BAP packet already includes a sequence number, the received BAP packet and its duplicates keep the sequence number, without another sequence number being added.

3. The method of claim 1, wherein obtaining the redundant BAP packets includes network encoding the received BAP packet.

4. The method of claim 3, wherein the redundant BAP packets resulting from the network encoding of the same received BAP packet are tagged with successive sequence numbers.

5. The method of claim 1, further comprising determining, from the BAP routing configuration, whether a sequence number has to be added to the redundant BAP packets compared to the received BAP packet or not.

6. A communication method in a wireless network comprising an Integrated Access and Backhaul, IAB, network, the method comprising at an IAB-node:

receiving, over one or more ingress links, Backhaul Adaptation Protocol, BAP, packets that are redundant to an original BAP packet, using a BAP routing configuration to perform a BAP-sublayer operation determining whether redundancy of the BAP packets ends at the IAB-node, and in case of positive determining, processing the redundant BAP packets to obtain the original BAP packet and transmit the single original BAP packet over an egress link or its content to upper layers of the IAB-node.

7. The method of claim 6, wherein processing the redundant BAP packets includes determining duplicates of an original BAP packet and discarding duplicates to keep a single duplicate as the single original BAP packet.

8. The method of claim 7, wherein determining duplicates includes identifying received BAP packets tagged with the same sequence number.

9. The method of claim 6, wherein processing the redundant BAP packets includes network decoding them to obtain the original BAP packet.

10. The method of claim 9, wherein receiving the redundant BAP packets includes identifying received BAP packets tagged with sequence numbers separate by less than a number of combinations defined by the network decoding.

11. The method of claim 6, further comprising determining, from the BAP routing configuration, whether a sequence number has to be removed from the original BAP packet compared to the received redundant BAP packets or not.

12. The method of claim 6, wherein the BAP routing configuration includes a first configuration table made of entries each associating one BAP routing identifier with one BAP address of another IAB-node, wherein the entry or entries corresponding to one or more BAP routing identifiers of the received BAP packets further define a BAP-sublayer operation to be performed to obtain the original BAP packet from the received redundant BAP packets.

13. The method of claim 12, wherein the BAP routing configuration includes a second configuration table made of entries associating one egress link with one or more RLC channels, and wherein an entry corresponding to a determined egress link is associated with a plurality of RLC channels.

14. The method of claim 13, wherein the entry further includes a triggering field defining one or more BAP routing identifiers for which the plurality of RLC channels is to be used.

15. A wireless communication device comprising:

at least one microprocessor configured for carrying out a process comprising:

receiving Backhaul Adaptation Protocol, BAP, packets wearing the same BAP routing identifier, using a BAP routing configuration to perform a BAP-sublayer operation determining, for the same BAP routing identifier, multiple Radio Link Control, RLC, channels for the received BAP packets, that belong to one or more egress links, and transmitting the BAP packets over the multiple RLC channels, wherein transmitting the BAP packets includes obtaining BAP packets redundant to a received BAP packet, the redundant BAP packets including the received BAP packet and one or more duplicates thereof, adding the same sequence number to the received BAP packet and the duplicates thereof, and sending the redundant BAP packets over the multiple RLC channels.

16. A network system comprising:

an IAB-donor Central Unit, an IAB-donor Distributed Unit and one or more IAB-nodes, one of the IAB-donor Distributed Unit and one or more IAB-nodes being configured for carrying out a process comprising:

receiving Backhaul Adaptation Protocol, BAP, packets wearing the same BAP routing identifier, using a BAP routing configuration to perform a BAP-sublayer operation determining, for the same BAP routing identifier, multiple Radio Link Control, RLC, channels for the received BAP packets, that belong to one or more egress links, and transmitting the BAP packets over the multiple RLC channels, wherein transmitting the BAP packets includes obtaining BAP packets redundant to a received BAP packet, the redundant BAP packets including the received BAP packet and one or more duplicates thereof, adding the same sequence number to the received BAP packet and the duplicates thereof, and sending the redundant BAP packets over the multiple RLC channels.

17. The network system of claim 16, wherein another one of the IAB-donor Distributed Unit and one or more IAB-nodes is configured for carrying out a process comprising:

receiving, over one or more ingress links, Backhaul Adaptation Protocol, BAP, packets that are redundant to an original BAP packet, using a BAP routing configuration to perform a BAP-sublayer operation determining whether redundancy of the BAP packets ends at the IAB-node, and in case of positive determining, processing the redundant BAP packets to obtain the original BAP packet and transmit the single original BAP packet over an egress link or its content to upper layers of the IAB-node.

18. A non-transitory computer-readable medium storing a program which, when executed by a microprocessor or computer system in a wireless device, causes the wireless device to perform a process comprising:

receiving Backhaul Adaptation Protocol, BAP, packets wearing the same BAP routing identifier, using a BAP routing configuration to perform a BAP-sublayer operation determining, for the same BAP routing identifier, multiple Radio Link Control, RLC, channels for the received BAP packets, that belong to one or more egress links, and transmitting the BAP packets over the multiple RLC channels, wherein transmitting the BAP packets includes obtaining BAP packets redundant to a received BAP packet, the redundant BAP packets including the received BAP packet and one or more duplicates thereof, adding the same sequence number to the received BAP packet and the duplicates thereof, and sending the redundant BAP packets over the multiple RLC channels.

* * * * *